(12) United States Patent
Redana et al.

(10) Patent No.: US 9,154,987 B2
(45) Date of Patent: Oct. 6, 2015

(54) RELAY-TO-RELAY INTERFERENCE COORDINATION IN A WIRELESS COMMUNICATION NETWORK

(75) Inventors: Simone Redana, Munich (DE); Omer Bulakci, Munich (DE); Abdallah Bou Saleh, Munich (DE); Bernhard Raaf, Neuried (DE)

(73) Assignee: Nokia Solutions and Networks Oy, Espoo (FI)

( * ) Notice: Subject to any disclaimer, the term of this patent is extended or adjusted under 35 U.S.C. 154(b) by 149 days.

(21) Appl. No.: 13/977,288

(22) PCT Filed: Dec. 30, 2010

(86) PCT No.: PCT/EP2010/070930
§ 371 (c)(1),
(2), (4) Date: Aug. 12, 2013

(87) PCT Pub. No.: WO2012/089269
PCT Pub. Date: Jul. 5, 2012

(65) Prior Publication Data
US 2013/0322322 A1    Dec. 5, 2013

(51) Int. Cl.
*H04B 7/14* (2006.01)
*H04W 24/10* (2009.01)
(Continued)

(52) U.S. Cl.
CPC ............ *H04W 24/10* (2013.01); *H04W 52/244* (2013.01); *H04W 84/047* (2013.01)

(58) Field of Classification Search
CPC .. H04W 24/10; H04W 84/047; H04W 52/244
USPC ........................................................ 370/315
See application file for complete search history.

(56) References Cited

U.S. PATENT DOCUMENTS

| 2009/0231989 | A1* | 9/2009 | Larsson et al. | 370/201 |
| 2010/0067427 | A1* | 3/2010 | Choudhury | 370/315 |
| 2011/0228700 | A1* | 9/2011 | Mildh et al. | 370/254 |

FOREIGN PATENT DOCUMENTS

| EP | 1 940 189 A2 | 7/2008 |
| WO | WO 2010/031436 | 3/2010 |

OTHER PUBLICATIONS

3GPP TR 36.806 V9.0.0 (Mar. 2010), "3$^{rd}$ Generation Partnership Project; Technical Specification Group Radio Access Network; Evolved Universal Terrestrial Radio Access (E-UTRA); Relay architectures for E-UTRA (LTE-Advanced) (Release 9)", 34 pgs.

(Continued)

*Primary Examiner* — Sai-Ming Chan
(74) *Attorney, Agent, or Firm* — Harrington & Smith

(57) ABSTRACT

A method includes receiving neighbor cell measurement results at a first relay node, the results originating from mobile device(s) located in a communications coverage area of the first relay node and that are served by the first relay node. Using the received neighbor cell measurement results, an amount of interference is estimated that is experienced by the first relay node due to operation of a second relay node. An interference report is sent that includes an indication of the estimated amount of interference from the first relay node to a network access node that serves the second relay node. The interference report is sent over a wireless link between the first relay node and the network access node that serves the first relay node, and from the network access node that serves the first relay node to the network access node that serves the second relay node.

25 Claims, 12 Drawing Sheets

(51) Int. Cl.
*H04W 52/24* (2009.01)
*H04W 84/04* (2009.01)

(56) References Cited

OTHER PUBLICATIONS

3GPP TR 36.814 V9.0.0 (Mar. 2010), "3$^{rd}$ Generation Partnership Project; Technical Specification Group Radio Access Network; Evolved Universal Terrestrial Radio Access (E-UTRA); Further advancements for E-UTRA physical layer aspec (Release 9)", 104 pgs.

3GPP TR 36.912 V9.2.0 (Mar. 2010), "3$^{rd}$ Generation Partnership Project; Technical Specification Group Radio Access Network; Feasibility study for Further Advancements for E-UTRA (LTE-Advanced) (Release 9)", 61 pgs.

3GPP TR 36.913 V9.0.0 (Dec. 2009), "3$^{rd}$ Generation Partnership Project; Technical Specification Group Radio Access Network; Requirements for further advancements for Evolved Universal Terrestrial Radio Access (E-UTRA) (LTE-Advanced) (Release 9)", 15 pgs.

3GPP TS 36.214 V9.2.0 (Jun. 2010), "3$^{rd}$ Generation Partnership Project; Technical Specification Group Radio Access Network; Evolved Universal Terrestrial Radio Access (E-UTRA); Physical layer; Measurements (Release 9)", 14 pgs.

3GPP TS 36.216 V1.0.0 (Sep. 2010), "3$^{rd}$ Generation Partnership Project; Technical Specification Group Radio Access Network; Evolved Universal Terrestrial Radio Access (E-UTRA); Physical layer for relaying operation (Release 10)", 12 pgs.

3GPP TS 36.300 V8.11.0 (Dec. 2009), 3$^{rd}$ Generation Partnership Project; Technical Specification Group Radio Access Network; Evolved Universal Terrestrial (E-UTRA) and Evolved Terrestrial Radio Access Network (E-UTRAN); overall description; Stage 2 (Release 8); 148 pgs.

3GPP TS 36.300 V9.3.0 (Mar. 2010), "3$^{rd}$ Generation Partnership Project; Technical Specification Group Radio Access Network; Evolved Universal Terrestrial Radio Access (E-UTRA) and Evolved Terrestrial Radio Access Network (E-UTRAN); overall description; Stage 2 (Release 9)", 166 pgs.

3GPP TS 36.423 V10.0.0 (Dec. 2010), "3$^{rd}$ Generation Partnership Project; Technical Specification Group Radio Access Network; Evolved Universal Terrestrial Radio Access (E-UTRAN); X2 application protocol (X2AP) (Release 10)", 123 pgs.

3GPP TSG RAN WG2 Meeting #66, San Francisco, USA, May 4-8, 2009, R2-092827, "Information exchange over a wireless X2 interface between relay nodes", Sharp, 3 pgs.

3GPP TS 36.211 V10.0.0 (Dec. 2010) "3rd Generation Partnership Project; Technical Specification Group Radio Access Network; Evolved Universal Terrestrial Radio Access (E-UTRA); Physical channels and modulation (Release 10)"; 3rd Generation Partnership Project (3GPP); Mobile Competence Centre; 650, Route des Lucioles; F-06921 Sophia-Antipolis Cedex; France; 103 pages.

3GPP TS 36.216 V10.0.0 (Sep. 2010) "3rd Generation Partnership Project; Technical Specification Group Radio Access Network; Evoved Universal Terrestrial Radio Access (E-UTRA); Physical layer for relaying operation (Release 10)" 3rd Generation Partnership Project (3GPP); Mobile Competence Centre; 650, Route des Lucioles; F-06921 Sophia-Antipolis Cedex; France, 12 pages.

* cited by examiner

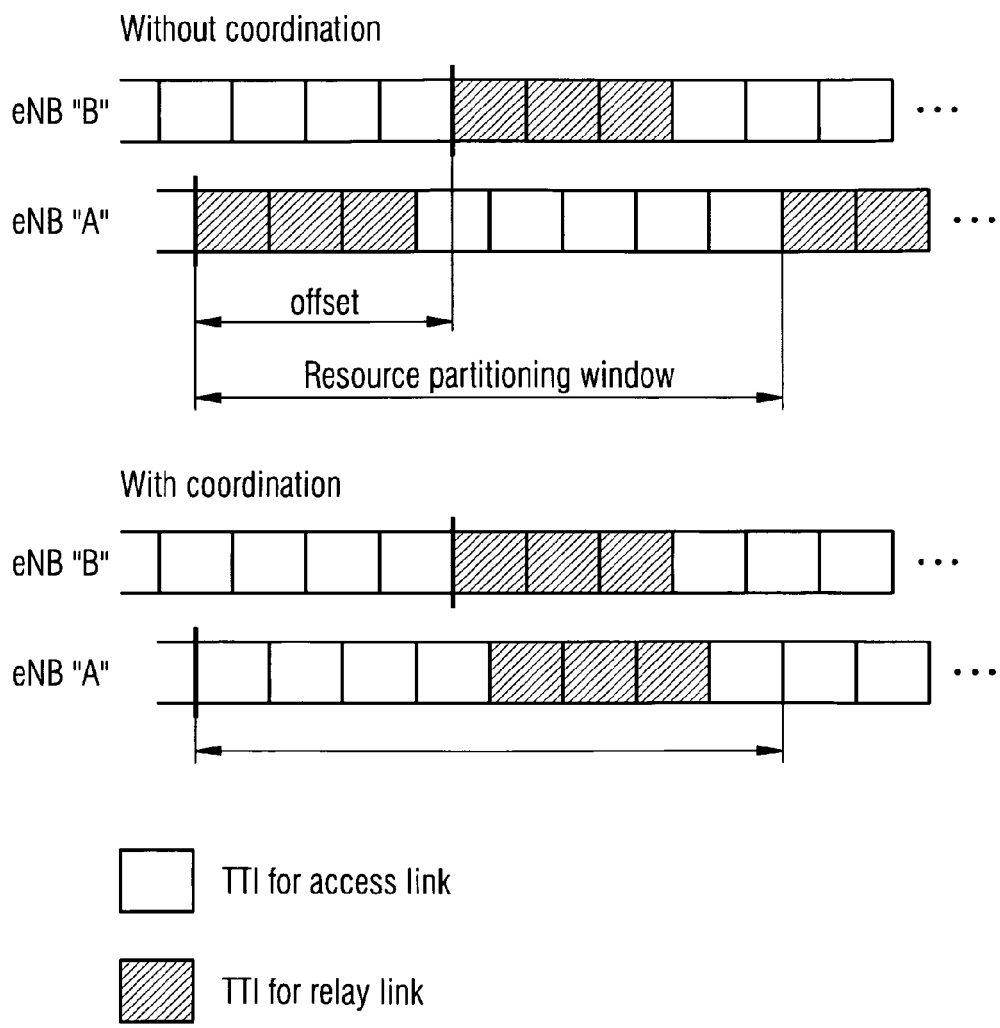

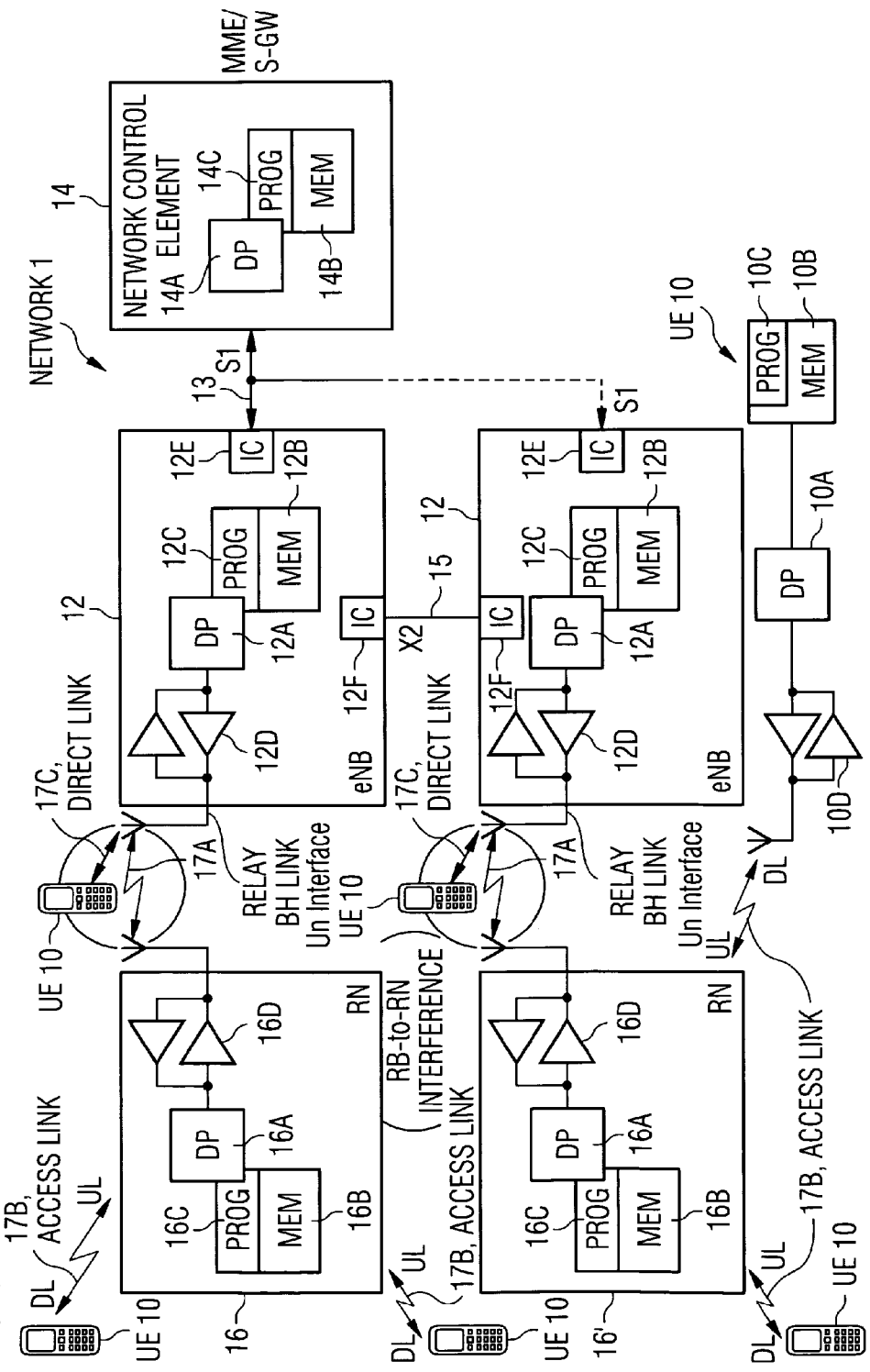

FIG 9

```
9A: RECEIVING AT A FIRST NETWORK ACCESS
NODE AN INTERFERENCE REPORT FROM A FIRST
RELAY NODE THAT IS SERVED BY THE FIRST
NETWORK ACCESS NODE
```
↓
```
9B: SENDING THE RECEIVED INTERFERENCE REPORT TO
A SECOND NETWORK ACCESS NODE THAT SERVES A
SECOND RELAY NODE, WHERE THE INTERFERENCE
REPORT COMPRISES AN ESTIMATE OF AN AMOUNT OF
INTERFERENCE EXPERIENCED BY THE FIRST RELAY NODE
DUE TO OPERATION OF THE SECOND RELAY NODE
```

RELAY-TO-RELAY INTERFERENCE COORDINATION IN A WIRELESS COMMUNICATION NETWORK

TECHNICAL FIELD

The exemplary and non-limiting embodiments of this invention relate generally to wireless communication systems, methods, devices and computer programs and, more specifically, relate to wireless communication networks that include relay nodes between network access nodes (e.g., base stations) and user equipment (e.g., mobile stations), and also relate to radio frequency interference coordination and mitigation in such networks.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
BS base station
DL downlink (eNB towards UE, or RN towards UE)
eNB E-UTRAN Node B (evolved Node B)
DeNB donor eNB
HeNB home eNB
EPC evolved packet core
E-UTRAN evolved UTRAN (LTE)
FDM frequency division multiplex
HII high interference indicator
IMTA international mobile telecommunications association
ICIC intercell interference coordination
ITU-R international telecommunication union-radiocommunication sector
LOS line of sight
LTE long term evolution of UTRAN (E-UTRAN)
LTE-A LTE advanced
MAC medium access control (layer 2, L2)
MBSFN multi-media broadcast over a single frequency network
MM/MME mobility management/mobility management entity
NodeB base station
OFDMA orthogonal frequency division multiple access
OI overload indicator
O&M operations and maintenance
PDCP packet data convergence protocol
PHY physical (layer 1, L1)
PRB physical resource block
PSS primary synchronization signals
Rel release
RLC radio link control
RN relay node
RNTP relative narrowband transmit (Tx) power
RRC radio resource control
RRM radio resource management
RSRP reference signal received power
RSRQ reference signal received quality
RSSI received signal strength indicator
SGW serving gateway
SC-FDMA single carrier, frequency division multiple access
SINR signal to interference plus noise ratio
SSS secondary synchronization signals
TDM time division multiplex
TTI transmission time interval
UE user equipment, such as a mobile station, mobile node or mobile terminal
UL uplink (UE towards eNB or RN)
UPE user plane entity
UTRAN universal terrestrial radio access network One modern communication system is known as evolved UTRAN (EUTRAN, also referred to as UTRAN-LTE or as E-UTRA). In this system the DL access technique is OFDMA, and the UL access technique is SC-FDMA.

One specification of interest is 3GPP TS 36.300, V8.11.0 (2009-12), 3rd Generation Partnership Project; Technical Specification Group Radio Access Network; Evolved Universal Terrestrial Radio Access (E-UTRA) and Evolved Universal Terrestrial Access Network (EUTRAN); Overall description; Stage (Release 8), incorporated by reference herein in its entirety. This system may be referred to for convenience as LTE Rel-8. In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.3.0 (2010-03).

FIG. 1 reproduces FIG. 4.1 of 3GPP TS 36.300 V8.11.0, and shows the overall architecture of the E-UTRAN system (Rel-8). The E-UTRAN system includes eNBs, providing the E-UTRAN user plane (PDCP/RLC/MAC/PHY) and control plane (RRC) protocol terminations towards the UEs. The eNBs are interconnected with each other by means of an X2 interface. The eNBs are also connected by means of an S1 interface to an EPC, more specifically to a MME by means of a S1 MME interface and to a S-GW by means of a S1 interface (MME/S-GW). The S1 interface supports a many-to-many relationship between MMEs/S-GWs/UPEs and eNBs.

The eNB hosts the following functions:

functions for RRM: RRC, Radio Admission Control, Connection Mobility Control, Dynamic allocation of resources to UEs in both UL and DL (scheduling);

IP header compression and encryption of the user data stream; selection of a MME at UE attachment;

routing of User Plane data towards the EPC (MME/S-GW);

scheduling and transmission of paging messages (originated from the MME);

scheduling and transmission of broadcast information (originated from the MME or O&M); and a measurement and measurement reporting configuration for mobility and scheduling.

Of particular interest herein are the further releases of 3GPP LTE (e.g., LTE Rel-10 and beyond) targeted towards future IMTA systems, referred to herein for convenience simply as LTE-Advanced (LTE-A). Reference in this regard may be made to 3GPP TR 36.913, V9.0.0 (2009-12), 3rd Generation Partnership Project; Technical Specification Group Radio Access Network; Requirements for Further Advancements for E-UTRA (LTE-Advanced) (Release 9). Reference can also be made to 3GPP TR 36.912 V9.2.0 (2010-03) Technical Report 3rd Generation Partnership Project; Technical Specification Group Radio Access Network; Feasibility study for Further Advancements for E-UTRA (LTE-Advanced) (Release 9).

A goal of LTE-A is to provide significantly enhanced services by means of higher data rates and lower latency with reduced cost. LTE-A is directed toward extending and optimizing the 3GPP LTE Rel-8 radio access technologies to provide higher data rates at lower cost. LTE-A will be a more optimized radio system fulfilling the ITU-R requirements for IMT-Advanced while keeping the backward compatibility with LTE Rel-8. As is specified in 3GPP TR 36.913, LTE-A should operate in spectrum allocations of different sizes, including wider spectrum allocations than those of LTE Rel-8 (e.g., up to 100 MHz) to achieve the peak data rate of 100 Mbit/s for high mobility and 1 Gbit/s for low mobility. It has been agreed that carrier aggregation is to be considered for LTE-A in order to support bandwidths larger than 20 MHz. Carrier aggregation, where two or more component carriers (CCs) are aggregated, is considered for LTE-A in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation as in LTE Rel-8.

Relay nodes can be used to extend cell coverage, in particular to provision high data rates in high shadowing environments (e.g., indoor coverage) and to enhance cell capacity with low cost for LTE-A systems.

Reference can be made to Section 9 "Relaying functionality" of 3GPP TR 36.814 V9.0.0 (2010-03) Technical Report 3rd Generation Partnership Project; Technical Specification Group Radio Access Network; Evolved Universal Terrestrial Radio Access (E-UTRA); Further advancements for E-UTRA physical layer aspects (Release 9).

Further by example, reference can be made to 3GPP TR 36.806 V9.0.0 (2010-03) Technical Report 3rd Generation Partnership Project; Technical Specification Group Radio Access Network; Evolved Universal Terrestrial Radio Access (E-UTRA); Relay architectures for E-UTRA (LTE-Advanced) (Release 9). This technical report discusses various architectures that have been proposed to implement the relay functionality. An architecture A is based on a termination of both the U-plane and the C-plane of the S1 interface at the RN. This architecture is then differentiated in a basic variant, Alt 1 and two other variants, Alt 2 and 3. In an architecture B the DeNB acts as the termination for S1 connections towards the EPC, and the RN can be simply seen as a cell managed by the DeNB from EPC and neighbor eNBs point of view. The DeNB acts as a S1-AP gateway, similar to a HeNB gateway.

SUMMARY

Certain advantages are realized by the use of the exemplary embodiments of this invention.

In a first aspect thereof the exemplary embodiments of this invention provide a method that comprises receiving neighbor cell measurement results at a first relay node, the neighbor cell measurement results originating from at least one mobile device located in a communications coverage area of the first relay node and that is served by the first relay node; estimating from the received neighbor cell measurement results an amount of interference experienced by the first relay node due to operation of a second relay node; and sending an interference report that comprises an indication of the estimated amount of interference from the first relay node to a network access node that serves the second relay node.

In another aspect thereof the exemplary embodiments of this invention provide a method that comprises receiving neighbor cell measurement results at a first relay node, the neighbor cell measurement results originating from at least one mobile device located in a communications coverage area of the first relay node and that is served by the first relay node; estimating from the received neighbor cell measurement results an amount of interference experienced by the first relay node due to operation of a second relay node; and sending an interference report, that comprises an indication of the estimated amount of interference, from the first relay node to the second relay node.

In another aspect thereof the exemplary embodiments of this invention provide an apparatus that comprises at least one processor and at least one memory including computer program code. The memory and computer program code are configured to, with the at least one processor, cause the apparatus to receive neighbor cell measurement results at a first relay node, the neighbor cell measurement results originating from at least one mobile device located in a communications coverage area of the first relay node and that is served by the first relay node; to estimate from the received neighbor cell measurement results an amount of interference experienced by the first relay node due to operation of a second relay node; and to send an interference report that comprises an indication of the estimated amount of interference from the first relay node to a network access node that serves the second relay node.

In another aspect thereof the exemplary embodiments of this invention provide an apparatus that comprises at least one processor and at least one memory including computer program code. The memory and computer program code are configured to, with the at least one processor, cause the apparatus to receive neighbor cell measurement results at a first relay node, the neighbor cell measurement results originating from at least one mobile device located in a communications coverage area of the first relay node and that is served by the first relay node; to estimate from the received neighbor cell measurement results an amount of interference experienced by the first relay node due to operation of a second relay node; and to send an interference report, that comprises an indication of the estimated amount of interference, from the first relay node to the second relay node.

In another aspect thereof the exemplary embodiments of this invention provide a method that comprises receiving at a first network access node an interference report from a first relay node that is served by the first network access node; and sending the received interference report to a second network access node that serves a second relay node, where the interference report comprises an estimate of an amount of interference experienced by the first relay node due to operation of the second relay node.

In a still further aspect thereof the exemplary embodiments of this invention provide an apparatus that comprises at least one processor and at least one memory including computer program code. The memory and computer program code are configured to, with the at least one processor, cause the apparatus to receive at a first network access node an interference report from a first relay node that is served by the first network access node; and to send the received interference report to a second network access node that serves a second relay node, where the interference report comprises an estimate of an amount of interference experienced by the first relay node due to operation of the second relay node.

In another aspect thereof the exemplary embodiments of this invention provide an apparatus that comprises means for receiving neighbor cell measurement results at a first relay node, the neighbor cell measurement results originating from at least one mobile device located in a communications coverage area of the first relay node and that is served by the first relay node; means for estimating from the received neighbor cell measurement results an amount of interference experienced by the first relay node due to operation of a second relay node; and means for sending an interference report, that comprises an indication of the estimated amount of interference, from the first relay node to one of a network access node that serves the second relay node or to the second relay node via the network access node that serves the second relay node.

In yet another aspect thereof the exemplary embodiments of this invention provide an apparatus that comprises means for receiving at a first network access node an interference report from a first relay node that is served by the first network access node; and means for sending the received interference report to a second network access node that serves a second relay node, where the interference report comprises an estimate of an amount of interference experienced by the first relay node due to operation of the second relay node.

In an exemplary embodiment, a method includes: receiving neighbor cell measurement results at a first relay node, the neighbor cell measurement results originating from at least one mobile device located in a communications coverage area of the first relay node and that is served by the first relay node; estimating from the received neighbor cell measurement results an amount of interference experienced by the first relay node due to operation of a second relay node; and sending an interference report, that comprises an indication of the estimated amount of interference, from the first relay node to a network access node that serves the second relay node.

A method as in the above, where the network access node that serves the second relay node is different from a network access node that serves the first relay node, and where the interference report is sent from the first relay node over a wireless link between the first relay node and the network access node that serves the first relay node, and from the network access node that serves the first relay node to the network access node that serves the second relay node.

A method as in the above, where the neighbor cell measurement results comprise reference signal received power and reference signal received quality measurement results, and where the interference report comprises an intercell interference coordination type of message.

A method as in the above, where an overload indicator is sent from the first relay node when it is a victim relay node to the network access node that serves the second relay node, and where a high interference indicator is received at the first relay node from the network access node serving the second relay node when it is an aggressor relay node. A method as in this paragraph, where the overload indicator sent by the first relay node indicates on which physical resource block or resource blocks the first relay node experiences interference from the second relay node, and where the high interference indicator received from the network access node that serves the second relay node indicates on which physical resource block or resource blocks the second network access node will schedule uplink backhauling for the second relay node.

A method as in the above, where the measurement results are received from a plurality of mobile devices and are weighted in accordance with a metric related to at least one of distance and path loss of each mobile device.

A method as in the above, further comprising exchanging preliminary interference estimation results with the second relay node to derive a final interference estimation, and where the interference report comprises an indication of the final interference estimation.

A method as in the above, further comprising making an interference estimation at a network access node at least partially on a neighbor cell measurement report made by at least a mobile device that is served by the network access node and that is located close to or within the coverage area of the first relay node, and where the network access node sends an interference report that comprises an indication of the estimated amount of interference to the network access node that serves the second relay node and to the first relay node.

Another exemplary embodiment is a non-transitory computer-readable medium that contains software program instructions, where execution of the software program instructions by at least one data processor results in performance of operations that comprise execution of the method of any one of the methods above.

A further exemplary embodiment is method, including: receiving neighbor cell measurement results at a first relay node, the neighbor cell measurement results originating from at least one mobile device located in a communications coverage area of the first relay node and that is served by the first relay node; estimating from the received neighbor cell measurement results an amount of interference experienced by the first relay node due to operation of a second relay node; and sending an interference report, that comprises an indication of the estimated amount of interference, from the first relay node to the second relay node. The method of this paragraph, where the interference report is sent via a network access node that serves the second relay node, where the network access node that serves the second relay node is different from a network access node that serves the first relay node, and where the interference report is sent from the first relay node over a wireless link between the first relay node and the network access node that serves the first relay node, and from the network access node that serves the first relay node to the network access node that serves the second relay node, and from the network access node that serves the second relay node over a wireless link to the second relay node.

A method as in the above, where the neighbor cell measurement results comprise reference signal received power and reference signal received quality measurement results, and where the interference report comprises an intercell interference coordination type of message.

A method as in the above, where an overload indicator sent by the first relay node indicates on which physical resource block or resource blocks the first relay node experiences interference from the second relay node.

A method as in the above, where the first relay node when it is an aggressor relay node replies to the receipt of the indication of an estimated amount of interference from a victim relay node by sending to the network access node that serves the victim relay node an indication of which physical resource block or physical resource blocks the first relay node will use to schedule an access link.

A method as in the above, where the measurement results are received from a plurality of mobile devices and are weighted in accordance with a metric related to at least one of distance and path loss of each mobile device.

A method as in the above, further comprising exchanging preliminary interference estimation results with the second relay node to derive a final interference estimation, and where the interference report comprises an indication of the final interference estimation.

A method as in the above, further comprising making an interference estimation at a network access node at least partially on a neighbor cell measurement report made by at least a mobile device that is served by the network access node and that is located close to or within the coverage area of the first relay node, and where the network access node sends an interference report that comprises an indication of the estimated amount of interference to the network access node that serves the second relay node and to the first relay node.

An additional exemplary embodiment is a non-transitory computer-readable medium that contains software program instructions, where execution of the software program instructions by at least one data processor results in performance of operations that comprise execution of the method of any one of the methods above.

A further exemplary embodiment is an apparatus, including: at least one processor; and at least one memory including computer program code, where the memory and computer program code are configured to, with the at least one processor, cause the apparatus to receive neighbor cell measurement results at a first relay node, the neighbor cell measurement results originating from at least one mobile device located in a communications coverage area of the first relay node and that is served by the first relay node; to estimate from the received neighbor cell measurement results an amount of interference experienced by the first relay node due to operation of a second relay node; and to send an interference report that comprises an indication of the estimated amount of interference from the first relay node to a network access node that serves the second relay node.

An apparatus as in the above, where the network access node that serves the second relay node is different from a network access node that serves the first relay node, and where the interference report is sent from the first relay node over a wireless link between the first relay node and the network access node that serves the first relay node, and from the network access node that serves the first relay node to the network access node that serves the second relay node.

An apparatus as in the above, where the neighbor cell measurement results comprise reference signal received power and reference signal received quality measurement results, and where the interference report comprises an inter-cell interference coordination type of message.

An apparatus as in the above, where an overload indicator is sent from the first relay node when it is a victim relay node to the network access node that serves the second relay node, and where a high interference indicator is received at the first relay node from the network access node serving the second relay node when it is an aggressor relay node. The method of this paragraph, where the overload indicator sent by the first relay node indicates on which physical resource block or resource blocks the first relay node experiences interference from the second relay node, and where the high interference indicator received from the network access node that serves the second relay node indicates on which physical resource block or resource blocks the second network access node will schedule uplink backhauling for the second relay node.

An apparatus as in the above, where the measurement results are received from a plurality of mobile devices and are weighted in accordance with a metric related to at least one of distance and path loss of each mobile device.

An apparatus as in the above, where said at least one processor is further configured to exchange preliminary interference estimation results with the second relay node to derive a final interference estimation, and where the interference report comprises an indication of the final interference estimation.

An apparatus as in the above, where an interference estimation is made at a network access node at least partially on a neighbor cell measurement report made by at least a mobile device that is served by the network access node and that is located close to or within the coverage area of the first relay node, and where the network access node sends an interference report that comprises an indication of the estimated amount of interference to the network access node that serves the second relay node and to the first relay node.

An apparatus as in the above, where said first relay node is coupled to a first network access node via a wireless Un interface, and where the interference report is sent to a second network access node that serves the second relay node via the first network access node over an X2 interface.

An additional exemplary embodiment is an apparatus, including: at least one processor; and at least one memory including computer program code, where the memory and computer program code are configured to, with the at least one processor, cause the apparatus to receive neighbor cell measurement results at a first relay node, the neighbor cell measurement results originating from at least one mobile device located in a communications coverage area of the first relay node and that is served by the first relay node; to estimate from the received neighbor cell measurement results an amount of interference experienced by the first relay node due to operation of a second relay node; and to send an interference report, that comprises an indication of the estimated amount of interference, from the first relay node to the second relay node.

An apparatus as in the above, where the inference report is sent via a network access node that serves the second relay node, where the network access node that serves the second relay node is different from a network access node that serves the first relay node, and where the interference report is sent from the first relay node over a wireless link between the first relay node and the network access node that serves the first relay node, and from the network access node that serves the first relay node to the network access node that serves the second relay node, and from the network access node that serves the second relay node over a wireless link to the second relay node.

An apparatus as in the above, where the neighbor cell measurement results comprise reference signal received power and reference signal received quality measurement results, and where the interference report comprises an inter-cell interference coordination type of message.

An apparatus as in the above, where an overload indicator sent by the first relay node indicates on which physical resource block or resource blocks the first relay node experiences interference from the second relay node.

An apparatus as in the above, where the first relay node when it is an aggressor relay node replies to the receipt of the indication of the estimated amount of interference from a victim relay node by sending to the network access node that serves the victim relay node an indication of which physical resource block or physical resource blocks the first relay node will use to schedule an access link.

An apparatus as in the above, where the measurement results are received from a plurality of mobile devices and are weighted in accordance with a metric related to at least one of distance and path loss of each mobile device.

An apparatus as in the above, where said at least one processor is further configured to exchange preliminary interference estimation results with the second relay node to derive a final interference estimation, and where the interference report comprises an indication of the final interference estimation.

An apparatus as in the above, where an interference estimation is made at a network access node at least partially on a neighbor cell measurement report made by at least a mobile device that is served by the network access node and that is located close to or within the coverage area of the first relay node, and where the network access node sends an interference report that comprises an indication of the estimated amount of interference to the network access node that serves the second relay node and to the first relay node.

An apparatus as in the above, where said first relay node is coupled to a first network access node via a wireless Un interface, and where the interference report is sent to the second relay node via the network access node that serves the second relay node over an X2 interface.

A further exemplary embodiment is a method, including: receiving at a first network access node an interference report from a first relay node that is served by the first network access node; and sending the received interference report to a second network access node that serves a second relay node, where the interference report comprises an estimate of an amount of interference experienced by the first relay node due to operation of the second relay node.

A method as above, where the interference report is received in a first format, and further comprising changing the format of the interference report to a second format prior to sending the interference report to the second network access node.

A method as above, further including: receiving at the first network access node an interference report from another network access node; determining if the received interference report is a first type of interference report or a second type of interference report; and only if the received inference report is of the first type taking a corrective action with respect to the first relay node to reduce inference caused by the first relay node to another relay node served by the another network access node.

A method as above, where the interference report comprises interference status for at least one physical resource block and at least one transmission time interval.

A method as above, where the received interference report is comprised of an overload indicator that indicates on which physical resource block or resource blocks the first relay node experiences interference from the second relay node, further comprising receiving a high interference indicator from the network access node that serves the second relay node and that indicates on which physical resource block or resource blocks the second network access node will schedule uplink backhauling for the second relay node, and further comprising sending the received high interference indicator to the first relay node.

A method as above, where the received interference report is comprised of an overload indicator that indicates on which physical resource block or resource blocks the first relay node experiences interference from the second relay node, further comprising receiving from the second relay node an indication of which physical resource block or physical resource blocks the second relay node will use to schedule an access link.

A method as above, further comprising making an interference estimation at the network access node at least partially on a neighbor cell measurement report made by at least a mobile device that is served by the network access node and that is located close to or within the coverage area of the first relay node, and where the network access node sends an interference report that comprises an indication of the estimated amount of interference to the network access node that serves the second relay node and to the first relay node.

Another exemplary embodiment is a non-transitory computer-readable medium that contains software program instructions, where execution of the software program instructions by at least one data processor results in performance of operations that comprise execution of the method of any one of the methods above.

A further exemplary embodiment is an apparatus, including: at least one processor; and at least one memory including computer program code, where the memory and computer program code are configured to, with the at least one processor, cause the apparatus to receive at a first network access node an interference report from a first relay node that is served by the first network access node; and to send the received interference report to a second network access node that serves a second relay node, where the interference report comprises an estimate of an amount of interference experienced by the first relay node due to operation of the second relay node.

An apparatus as above, where the interference report is received in a first format, and further comprising changing the format of the interference report to a second format prior to sending the interference report to the second network access node.

An apparatus as above, where said processor is further configured to receive at the first network access node an interference report from another network access node; to determine if the received interference report is a first type of interference report or a second type of interference report; and only if the received inference report is of the first type to take a corrective action with respect to the first relay node to reduce inference caused by the first relay node to another relay node served by the another network access node.

An apparatus as above, where the interference report comprises interference status for at least one physical resource block and at least one transmission time interval.

An apparatus as above, where the received interference report is comprised of an overload indicator that indicates on which physical resource block or resource blocks the first relay node experiences interference from the second relay node, where the at least one processor is further configured to receive a high interference indicator from the network access node that serves the second relay node and that indicates on which physical resource block or resource blocks the second network access node will schedule uplink backhauling for the second relay node, and to send the received high interference indicator to the first relay node.

An apparatus as above, where the received interference report is comprised of an overload indicator that indicates on which physical resource block or resource blocks the first relay node experiences interference from the second relay node, where the at least one processor is further configured to receive from the second relay node an indication of which physical resource block or physical resource blocks the second relay node will use to schedule an access link.

An apparatus as above, said at least one processor further configured to make an interference estimation at the network access node at least partially on a neighbor cell measurement report made by at least a mobile device that is served by the network access node and that is located close to or within the coverage area of the first relay node, and to send an interference report that comprises an indication of the estimated amount of interference to the network access node that serves the second relay node and to the first relay node.

An apparatus as above, where said first network access node is coupled to the first relay node via a wireless Un interface, and where the interference report is sent to the second network access node that serves the second relay node over an X2 interface.

A further exemplary embodiment is an apparatus, including: means for receiving neighbor cell measurement results at a first relay node, the neighbor cell measurement results originating from at least one mobile device located in a communications coverage area of the first relay node and that is served by the first relay node; means for estimating from the received neighbor cell measurement results an amount of interference experienced by the first relay node due to operation of a second relay node; and means for sending an interference report that comprises an indication of the estimated amount of interference from the first relay node to one of a network access node that serves the second relay node or to the second relay node via the network access node that serves the second relay node.

Yet another exemplary embodiment is an apparatus, including: means for receiving at a first network access node an interference report from a first relay node that is served by the first network access node; and means for sending the received interference report to a second network access node that serves a second relay node, where the interference report comprises an estimate of an amount of interference experienced by the first relay node due to operation of the second relay node.

BRIEF DESCRIPTION OF THE DRAWINGS

In the attached Drawing Figures:

FIG. 4 illustrates RN-to-RN interference due to uncoordinated eNB resource partitioning (upper portion of the figure) and due to coordinated resource partitioning (lower portion of the figure) in unsynchronized networks, such as FDD-based networks.

FIG. 6 is a simplified block diagram of a communications system wherein the exemplary embodiments of this invention can be implemented.

FIG. 9 is a logic flow diagram that illustrates the operation of another method, and a result of execution of computer program instructions embodied on a computer readable memory, further in accordance with the exemplary embodiments of this invention.

DETAILED DESCRIPTION

Figure 2A:
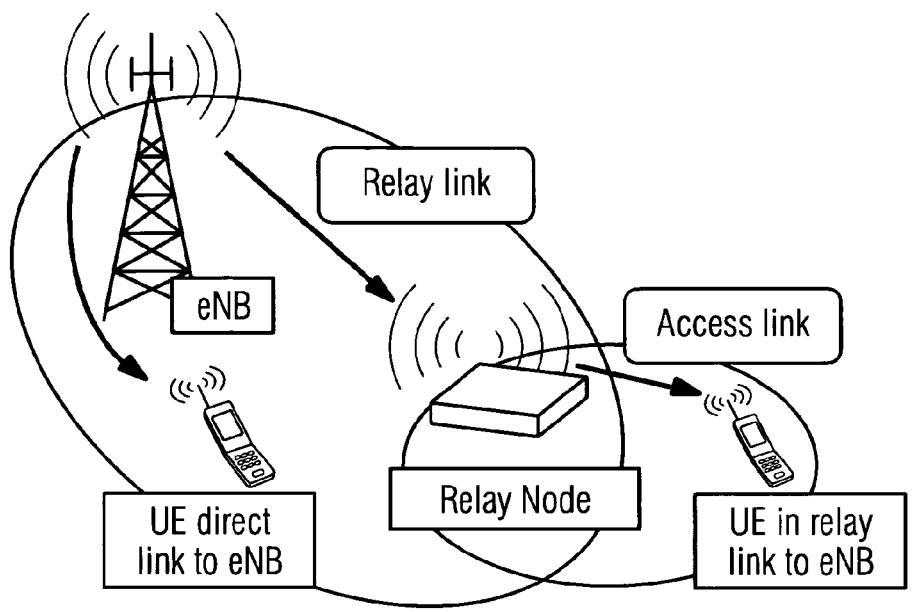
FIG. 2A shows an example of an LTE-A radio cellular deployment using relay nodes.

By way of introduction, FIG. 2A shows an exemplary typical LTE radio access scenario that includes relay nodes (RNs). There are basically three different links in such a deployment:

a direct link (the normal cellular connection between a DeNB and a UE);

a backhaul link or relay link (the connection between a DeNB and an RN); and an access link (the connection between an RN and a UE).

In the following the eNB serving the RN can be equally referred to as an eNB or donor eNB (DeNB).

Figure 2B:
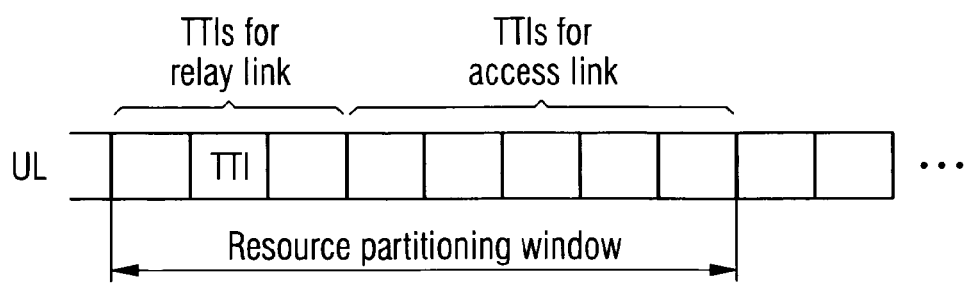
FIG. 2B shows an exemplary TDM separation of access and relay links for an UL band (FDD mode), and similarly can also be applied for a DL band.

There are many types of relays which might be applicable to different scenarios. A so-called Type 1 relay node is being specified (see 3GPP TR 36.814 V9.0.0). The Type 1 relay is an in-band relay which will use the same frequency band for the relay link and the access link, and which controls its own cell. A unique physical-layer cell identity is provided for each of the cells. Similar RRM mechanisms and protocol stacks are available, and from the perspective of the UE there is no difference between the cells controlled by a relay and the cells controlled by a "normal" eNB. Additionally, to achieve backwards compatibility the cells controlled by the RN should also support LTE Rel-8 UEs. Moreover, for the Type 1 relay the access link and relay link transmissions are time multiplexed, which means the RN cannot communicate with RN-UEs and the eNB (DeNB) simultaneously. Referring to FIG. 2B, there is a defined time frame consisting of several TTIs (referred to in the following discussion as a resource partitioning window) where one subset of the TTIs is used for relay links and the complementary subset of the TTIs is used for the access links. The sub-frames (or equivalently TTIs) assigned to the backhaul link (relay link) need to be configured as MBSFN sub-frames by the RNs on the access links. Reference in this regard can be made to 3GPP TS 36.216 V10.0.0 (2010-09) Technical Specification 3rd Generation Partnership Project; Technical Specification Group Radio Access Network; Evolved Universal Terrestrial Radio Access (E-UTRA); Physical layer for relaying operation (Release 10, Section 5 "Physical Channels and Modulation", and more specifically in Section 5.1 "Resource partitioning and multiplexing for relays". Reference can also be made to the above-referenced Section 9 "Relaying functionality" of 3GPP TR 36.814 V9.0.0 (2010-03), in particular Section 9.1.2 "Backward compatible backhaul partitioning". All of the available resources can be used for the direct links, i.e., they share the resources with the relay links (the user scheduler at the eNB decides to schedule relay or direct links on any particular PRB, such as frequency resources of the OFDM system) and use the same resources as the access links by using, for example, some interference coordination (ICIC) technique.

ICIC (inter-cell interference coordination) generally has the task to manage radio resources (notably the radio resource blocks) such that inter-cell interference is kept under control. ICIC is inherently a multi-cell RRM function that needs to take into account information (e.g., the resource usage status and traffic load situation) from multiple cells. The preferred ICIC method may be different in the uplink and downlink. The ICIC functionality may typically be located in the eNB.

Due to the time multiplexing feature of the relay link and access link for the Type 1 relay, a new type of interference can arise. This new type of interference is introduced by the relays themselves and can be characterized as relay-to-relay (RN-to-RN) interference or equivalently as backhaul-access interference among different relays. This type of interference will exist for both the DL and the UL, and mainly arises when multiple relays do not perform the backhaul transmission or access transmission at the same time. The RN-to-RN interference does not arise in other heterogeneous networks such as femtocell and picocell eNB deployments. As a result the RN-to-RN interference has not previously been studied in detail and its impact has not been thoroughly investigated.

Figure 3:
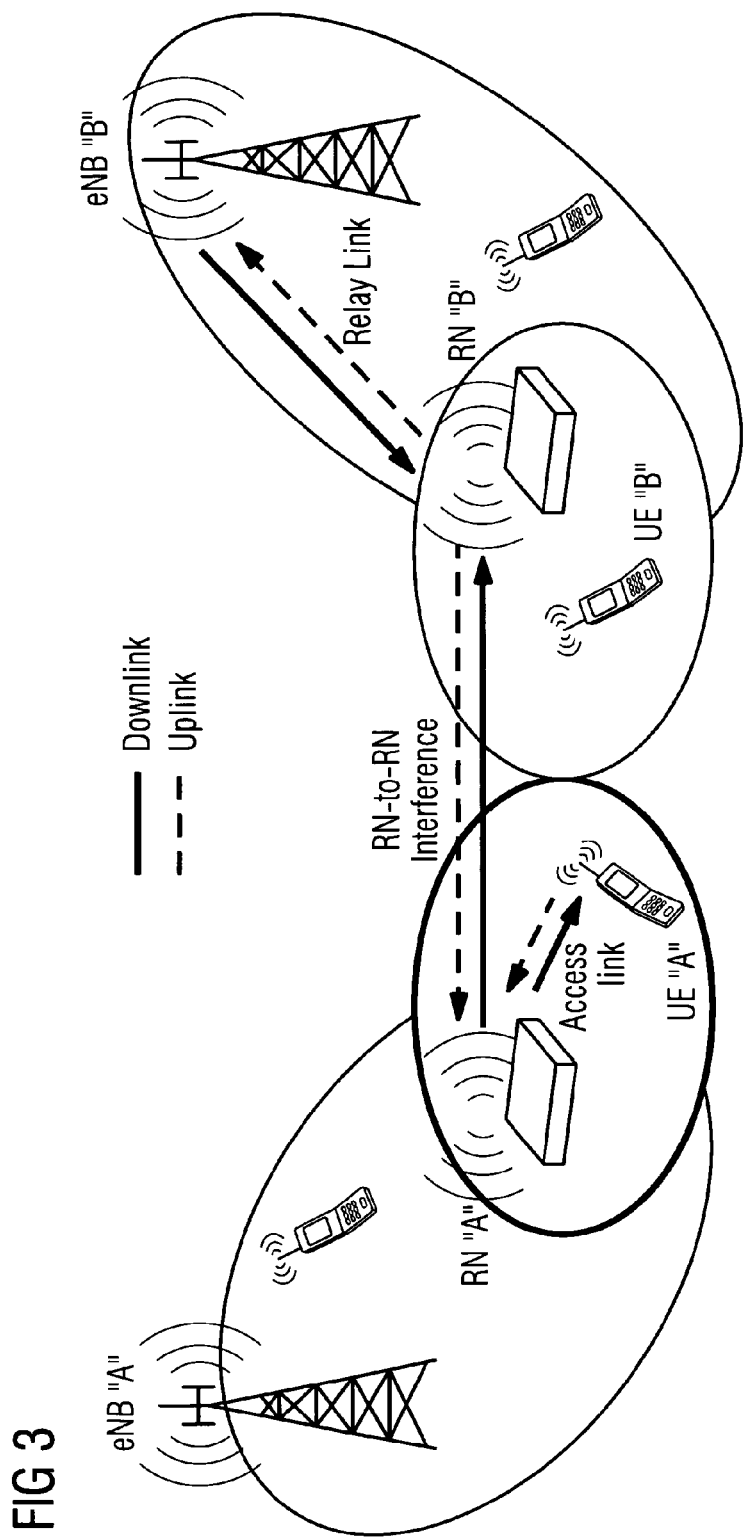
FIG. 3 shows exemplary scenarios in the DL and UL where RN-to-RN interference is experienced.

FIG. 3 presents scenarios in the DL and UL where RN-to-RN interference is experienced. In the DL (solid lines) the RN-to-RN interference occurs when RN "A"-to-UE "A" communication interferes with the victim eNB "B"-to-RN "B" communication. Although there is a significant difference in antenna gains, transmission powers, etc., between eNB "B" and RN "A" (in favor of the former), the relatively high probability of having a line-of-sight (LOS) propagation between RN "A" and RN "B" could cause the RN-to-RN interference or equivalently access-to-backhaul interference (in the DL it is the access link of one RN interfering with the backhaul of another RN) to be larger than the desired signal. In general the path loss on the LOS connection can be considerably less than that on the non-LOS (NLOS) connection.

In the UL (dashed lines) the RN-to-RN interference occurs when the RN "B"-to-eNB "B" communication interferes with the victim UE "A"-to-RN "A" communication. In a case of no power control (UEs and RNs transmit at maximum available power) the interfering signal can be significantly higher than the desired signal due to the difference in antenna gains, transmission powers, etc., between UE "A" and RN "B". This is true because the RN "B" has typically a higher transmit power than the UE, and also has an antenna with higher gain. Furthermore, the antenna of the RN can be at a higher altitude and will therefore more likely have a LOS connection to the victim's interfered RN antenna. On the other hand, RN-to-RN interference or equivalently backhaul-to-access interference (in the UL the backhauling of one RN interferes with the access of a neighbor RN) could become for some relay deployments even more troublesome (depending on the specifics of the deployment) if power control (e.g., LTE Rel-8 compliant power control) is applied. Here, the worst case scenario occurs when the aggressor RN has NLOS connection to its DeNB (i.e., transmitting with higher power) and has a LOS link with the victim RN.

As should be apparent the RN-to-RN interference can significantly degrade the relay link quality in downlink (access-to-backhaul interference), and can have an even more detrimental impact on the access link quality in uplink (backhaul-to-access interference). This degradation could occur, for example, in the following two exemplary scenarios.

In a first scenario neighboring RNs may be controlled by different independent DeNBs, which are using different resource partitioning (different set of TTIs for access and relay links), i.e., there is no resource use coordination between the eNBs. Thus, it may be the case that there are contemporaneously occurring downlink (uplink) transmissions on the access link for one RN and downlink (uplink) backhauling transmissions on the neighboring RN. The upper portion of FIG. 4 presents an example of such a case, where different TTIs are utilized in different cells to serve the access and relay links, and where the eNBs are not coordinated.

In a second scenario eNBs in the network coordinate and apply the same resource partitioning, i.e., the same TTIs are configured in both cells to serve the access or relay links (the lower portion of FIG. 4). However, it may still be the case that RN-to-RN interference takes place. This is mainly due to a lack of inter-eNB time synchronization in FDD systems which can create a time offset and, hence, result in a partial overlap between relay link and access link transmissions in different cells.

A sub-frame alignment scheme could be proposed to alleviate the RN-to-RN interference. A scenario where neighboring DeNBs determine different resource partitioning can be considered. Basically such a sub-frame alignment scheme would only alleviate the RN-to-RN interference between neighboring RNs connected to different DeNBs, and would not be beneficial in the case where neighboring RNs are connected to the same DeNB. The latter is true because the RNs connected to the same DeNB do not have the sub-frames assigned to backhaul and access aligned among them, but aligned instead to neighboring RNs belonging to different DeNBs that therefore might have different sub-frames assignment. Moreover, and as was discussed above, if the sub-frame alignment is not perfect due to some timing offset the RN-to-RN interference can still be present.

An additional measurements scheme could also be proposed to alleviate the RN-to-RN interference. In this scheme additional measurements are made at the RNs in order to generate interference reports. These reports are then transmitted over the X2 interface. However, due to the additional measurements the implementation complexity increases. Moreover, these additional measurements can increase the latency in the relay system as the RN has to enter a listening mode to perform the measurements. Since the RN needs to dedicate some time to make (and report) these measurements it cannot also receive/transmit data from/to DeNB/UEs which results in a reduction of capacity.

The exemplary embodiments of this invention disclosed below can be applied together with the first scheme/proposal since as described above it requires further solutions to mitigate the RN-to-RN interference between the RNs served by the same donor eNB, and to cope with the cases where the sub-frame alignment between neighboring eNBs is imperfect due to a lack of inter-eNB time synchronization. In addition, the exemplary embodiments can be used in lieu of the second scheme/proposal such that the interference coordination is accomplished without requiring additional measurements and related reporting complexity.

Figure 1:
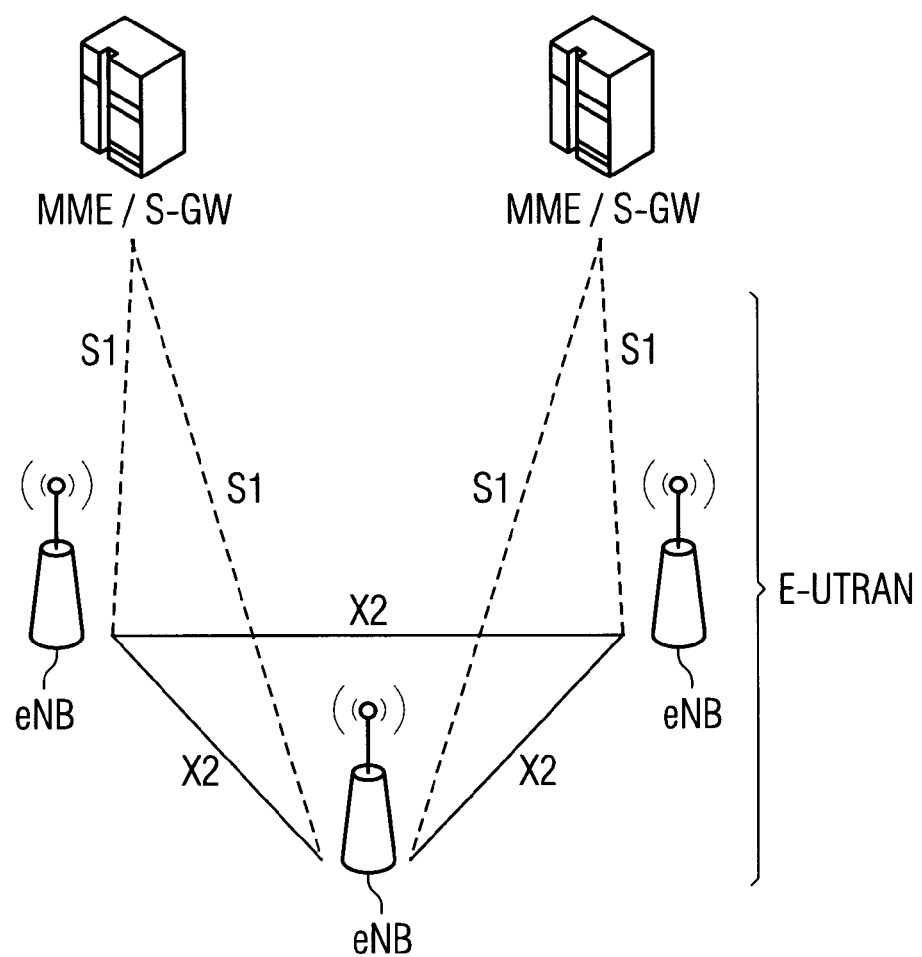
FIG. 1 reproduces FIG. 4.1 of 3GPP TS 36.300 and shows the overall architecture of the EUTRAN system.

Before describing in further detail the exemplary embodiments of this invention, reference is made to FIG. 6 for illustrating a simplified block diagram of various electronic devices and apparatus that are suitable for use in practicing the exemplary embodiments of this invention. In FIG. 6 a wireless communication network 1 is adapted for communication over wireless links with a population of apparatus, such as mobile communication devices which may be referred to as UEs 10, via a (wireless) network access node, such as a Node B (base station), and more specifically an eNB 12. The network 1 can contain at least one network control element (NCE) 14 that may include the MME/S-GW functionality shown in FIG. 1, and which can provide connectivity with a further network, such as a telephone network and/or a data communications network (e.g., the internet). Each UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transceiver 10D for bidirectional wireless communications with the eNB 12 via one or more antennas. The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D (containing at least one transmitter and receiver) for communication with the UE 10 via one or more antennas (typically several when multiple input/multiple output (MIMO) operation is in use). The eNB 12 is coupled via suitable interface circuitry (IC) 12E to a data/control path 13 to the NCE 14. The path 13 may be implemented as the S1 interface shown in FIG. 1. The eNB 12 is also coupled to another eNB 12 via suitable interface circuitry (IC) 12F to a data/control path 15, which may be implemented as the X2 interface shown in FIG. 1. Note that NCE 14 will typically also be similarly constructed so as to include at least one computer or DP 14A, at least one non-transitory computer-readable memory medium embodied as a memory (MEM) 14B that stores a program of computer instructions (PROG) 14C.

The network 1 further includes a plurality of RNs 16. Each RN 16 also includes a controller, such as at least one computer or a data processor (DP) 16A, at least one computer-readable memory medium embodied as a memory (MEM) 16B that stores a program of computer instructions (PROG) 16C, and at least one suitable RF transceiver 16D (containing at least one transmitter and receiver) for communication with the eNB 12 (which functions as a DeNB for the particular RN 16) via a relay/backhaul (BH) link 17A. Each RN 16 is also adapted to communicate as well with one or more UEs 10 in its coverage area via access links 17B. Note that some UEs 10 can be connected with the eNB 12 in a conventional manner via direct links 17C.

At least one of the PROGs 12C and 16C is assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 16A of the RN 16 and/or by the DP 12A of the eNB 12, or by hardware, or by a combination of software and hardware (and firmware).

In general, the various embodiments of the UEs 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable MEMS 10B, 12B, 14B and 16B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The DPs 10A, 12A, 14A and 16A may be of any type suitable to the local technical environment, and may include one or more of general purpose computers, special purpose computers, microprocessors, digital signal processors (DSPs) and processors based on multi-core processor architectures, as non-limiting examples.

For describing the exemplary embodiments it can be assumed that RN-to-RN interference exists between the two RNs 16. In this case it can be assumed that one of the RNs 16 is a "victim" RN (a victim of the interference), while the other is an "aggressor" RN (designated as RN16' in FIG. 6).

In accordance with the exemplary embodiments of this invention the victim RN 16 estimates the RN-to-RN interference (for example in terms of path loss between the two RNs 16) through the use of neighboring cell measurements performed by at least some UEs 10 in its coverage area. The victim RN 16 sends this estimation to the DeNB 12 that controls the aggressor RN 16'.

The algorithm(s) used at the victim RN 16 to estimate the RN-to-RN interference and create the content of the Overload Indicator (OI) messages sent to the DeNB 12 that controls the aggressor RN 16' can take any of a number of forms and can be implementation-specific. In general, these algorithms can include averaging or otherwise combining multiple UE 10 measurements made by the same UE 10 or made by multiple UEs 10.

One non-limiting example of an interference estimation method or procedure or algorithm is now provided. In general, the algorithm to be employed depends on the message intended. For example, assume that it is intended to send a message of the form I_est (estimated interference with three levels; high, medium, low). The algorithm is as follows (assume that there exist relay-UEs within the coverage area):

1) Assign weights (w_UE) to each UE 10 (where a weight may be considered as a reliability index which may depend on the distance and/or path-loss or any other metric or factor).

2) Determine the average of w_UE*I_est_UE for w_UE>w_TH, where w_TH is a predetermined threshold value.

If none of the UEs have w_UE>w_TH, request an exchange of information with the aggressor RN 16' (or make use of the information available through macro UEs in the vicinity of the RN coverage area such that w_macroUE>w_TH).

3) The RN 16 adds a flag to I_est (RN-to-RN interference flag) and this message is then sent to the target eNB 12 over the X2 interface 15.

The victim RN 16 can also provide information regarding the RN-to-RN interference per PRB and TTI using, for example, the LTE Rel-8/9 ICIC procedures between the victim RN and the DeNB 12 that controls the aggressor RN 16'. The messages sent over the X2 interface 15 may be modified to support this use case. The OI, HII and RNTP messages used for ICIC are described in 3GPP TS 36.423 V10.0.0 (2010-12) Technical Specification 3rd Generation Partnership Project; Technical Specification Group Radio Access Network; Evolved Universal Terrestrial Radio Access Network (E-UTRAN); X2 application protocol (X2AP) (Release 10), Section 9.1.2.1 "Load Information". This message is sent by an eNB to neighbouring eNBs to transfer load and interference coordination information. Note that how the ICIC procedures are actually implemented by an eNB are typically vendor specific.

For the sake of clarity in the following description the exemplary embodiments are described primarily in the case of RN-to-RN interference in the UL, where the UL backhaul 17A (RN to eNB) of the aggressor RN 16' interferes with the UL access link 17B of the victim RN 16. A modification to deal with RN-to-RN interference in the DL is discussed as well.

The exemplary embodiments of this invention beneficially use existing UE measurements. These measurements may be, for example, UE neighbor cell signal strength measurements such as RSRP and RSRQ. The UE measurements are used to approximate the interference experienced by a certain RN 16 (victim RN) from transmissions of other RNs. While a measurement by the RN 16 itself would be more direct, such a measurement is difficult to make in practice as the RN 16 cannot make continuous measurements. Further, the victim RN 16 may not be able to synchronize to the aggressor RN 16', i.e., may not be able to detect the PSS and/or the SSS of the aggressor RN 16' in order to make direct measurements.

Reference with regard to RSRP and RSRQ measurements can be made to 3GPP TS 36.214 V9.2.0 (2010-06) Technical Specification 3rd Generation Partnership Project; Technical Specification Group Radio Access Network; Evolved Universal Terrestrial Radio Access (E-UTRA); Physical layer; Measurements (Release 9).

In subclause 5.1.1 the reference signal received power (RSRP) is defined as the linear average over the power contributions (in [W]) of the resource elements that carry cell-specific reference signals within the considered measurement frequency bandwidth. For RSRP determination the cell-specific reference signals R0 according 3GPP TS 36.211 are used. If the UE can reliably detect that R1 is available it may use R1 in addition to R0 to determine RSRP. The reference point for the RSRP is the antenna connector of the UE. If receiver diversity is in use by the UE, the reported value is not lower than the corresponding RSRP of any of the individual diversity branches.

In subclause 5.1.3 the reference signal received quality (RSRQ) is defined as the ratio given by N times RSRP/(E-UTRA carrier RSSI), where N is the number of resource blocks (RBs) of the E-UTRA carrier RSSI measurement bandwidth. The measurements in the numerator and denominator are made over the same set of resource blocks. The E-UTRA carrier received signal strength indicator (RSSI) comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise, etc. The reference point for the RSRQ is the antenna connector of the UE. If receiver diversity is in use by the UE the reported value is not lower than the corresponding RSRQ of any of the individual diversity branches.

Figure 5A:
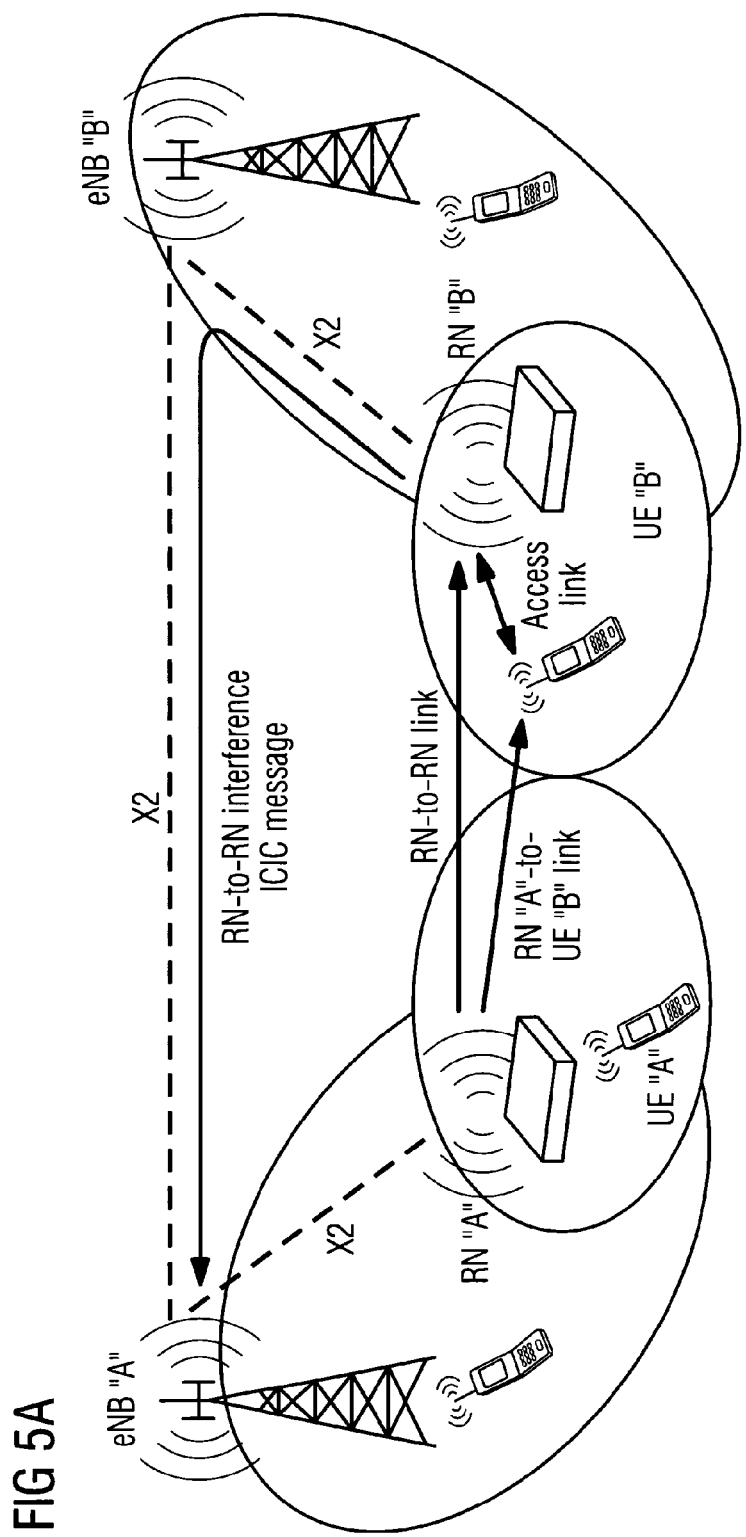
FIGS. 5A, 5B, 5C and 5D present an exemplary scenario wherein the embodiments of this invention can be employed.
Figure 5B:
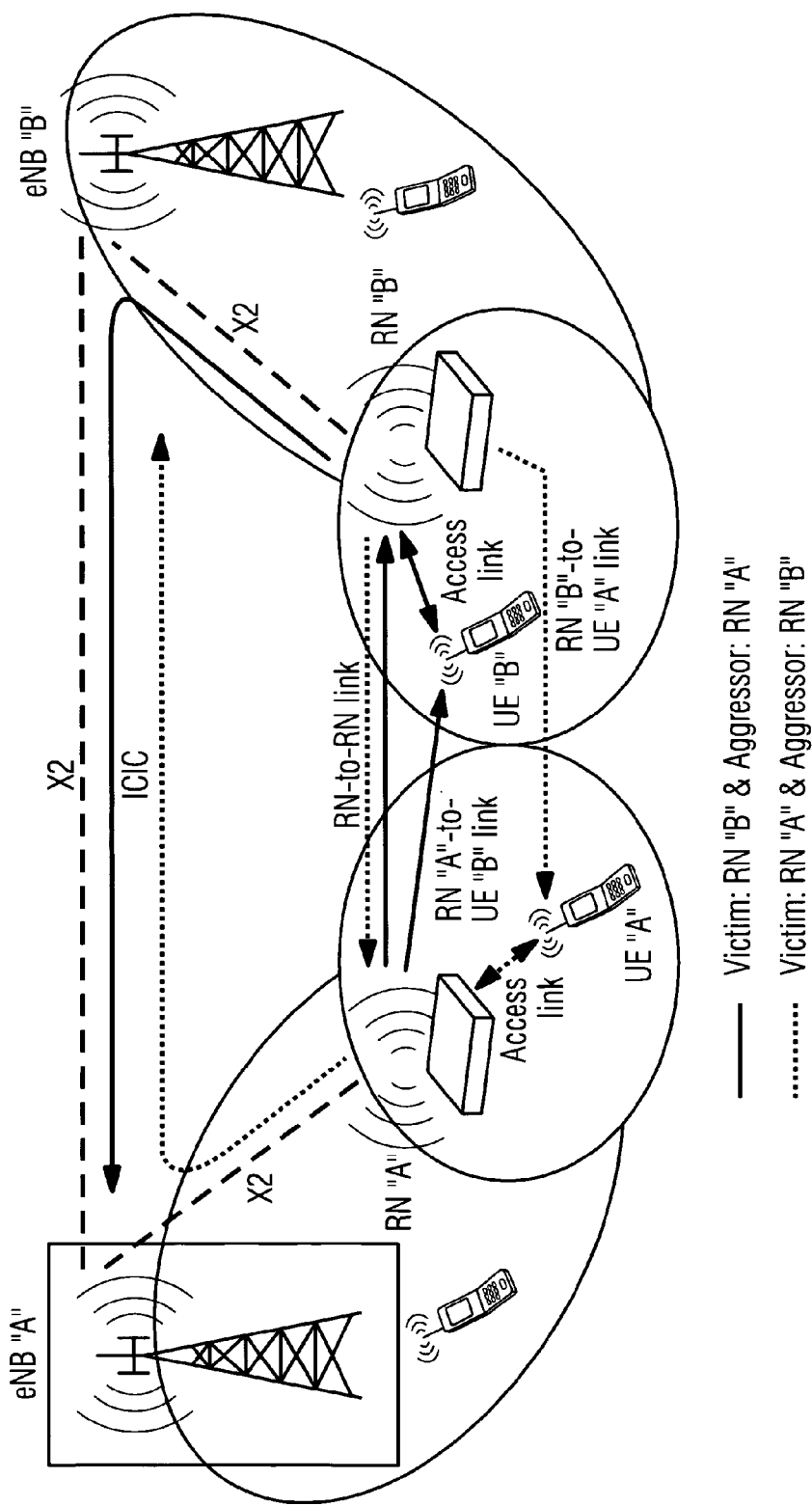

In accordance with an aspect of the exemplary embodiments of this invention additional implementation complexity at the RN 16 is avoided since the measurements (e.g., RSRP, RSRQ) of the UEs 10 within the serving/coverage area of the RN 16 are already available at the RN 16. A predetermined RN-to-RN interference ICIC type of message can then be used by the RN 16 to convey an interference report which approximates the RN-to-RN interference levels. This interference report can be exchanged via the X2 interface 15, between the victim RN 16 and the DeNB 12 that controls the aggressor RN 16'. FIGS. 5A, 5B, 5C and 5D, collectively referred to as FIG. 5, present an example of a scenario where this approach can be applied to coordinate the RN-to-RN interference. FIG. 5A shows the RN-to-RN interference imposed in the uplink by RN "A" (aggressor RN 16') on RN "B" (victim RN 16). FIG. 5B also shows the RN-to-RN interference in the uplink where the victim RN 16 is RN "A" and the aggressor RN 16' is the RN "B".

More specifically, FIG. 5B shows that the RN-to-RN interference is symmetric, as the UL backhauling of RN A interferes with the UL access of RN B as well as UL backhauling of RN B interferers with UL access of RN A. Symmetry also exits in the DL where the DL access of RN A interferes with the DL backhaul of RN B as well as the DL access of RN B interferes with DL backhaul of RN A.

In the case of FIG. 5A the exchange of the interference report is between the RN "B" and the eNB "A" since the RN-to-RN interference is between the backhaul of RN "A" (the RN "A" can be regarded as a UE for the eNB "A") and the access link of the RN "B". Such a scenario can as well be considered for the case where the RN "A" is the victim and RN "B" is the aggressor (as in FIG. 5B). In this case the ICIC message is exchanged between the RN "A" and the eNB "B" because the interference is between the backhaul of RN "B" and the access of RN "A".

It should be noted that the exemplary embodiments of this invention are also applicable to the case where the two RNs 16 are served by the same donor eNB 12. This is possible when the DeNB 12 assign different sub-frames for backhauling to its served RNs, for example, for the downlink the RNs have different MBSFN sub-frame configurations of the access links.

In the exemplary scenario shown in FIG. 5A the RN-to-RN interference between RN "A" and RN "B" is approximated (estimated) by RN "B" depending on measurements performed at UE "B", where UE "B" is located within the coverage area of, and is being served by, RN "B". In other words, the RN-to-RN link conditions can be estimated according to the measurements made by UE "B" for the RN "A"-to-UE "B" link. As below rooftop transmission conditions can be assumed to apply to both RN-to-RN and RN "A"-to-UE "B" links, these links can be assumed to be highly correlated. Moreover, the smaller coverage area of a particular RN 16 (relative to the eNB 12) further justifies this correlation. It is pointed out that measurements done at a UE 10 which is closer to the RN 16 can yield a more accurate estimation, depending on the estimation algorithm used by the RN 16.

Figure 5C:
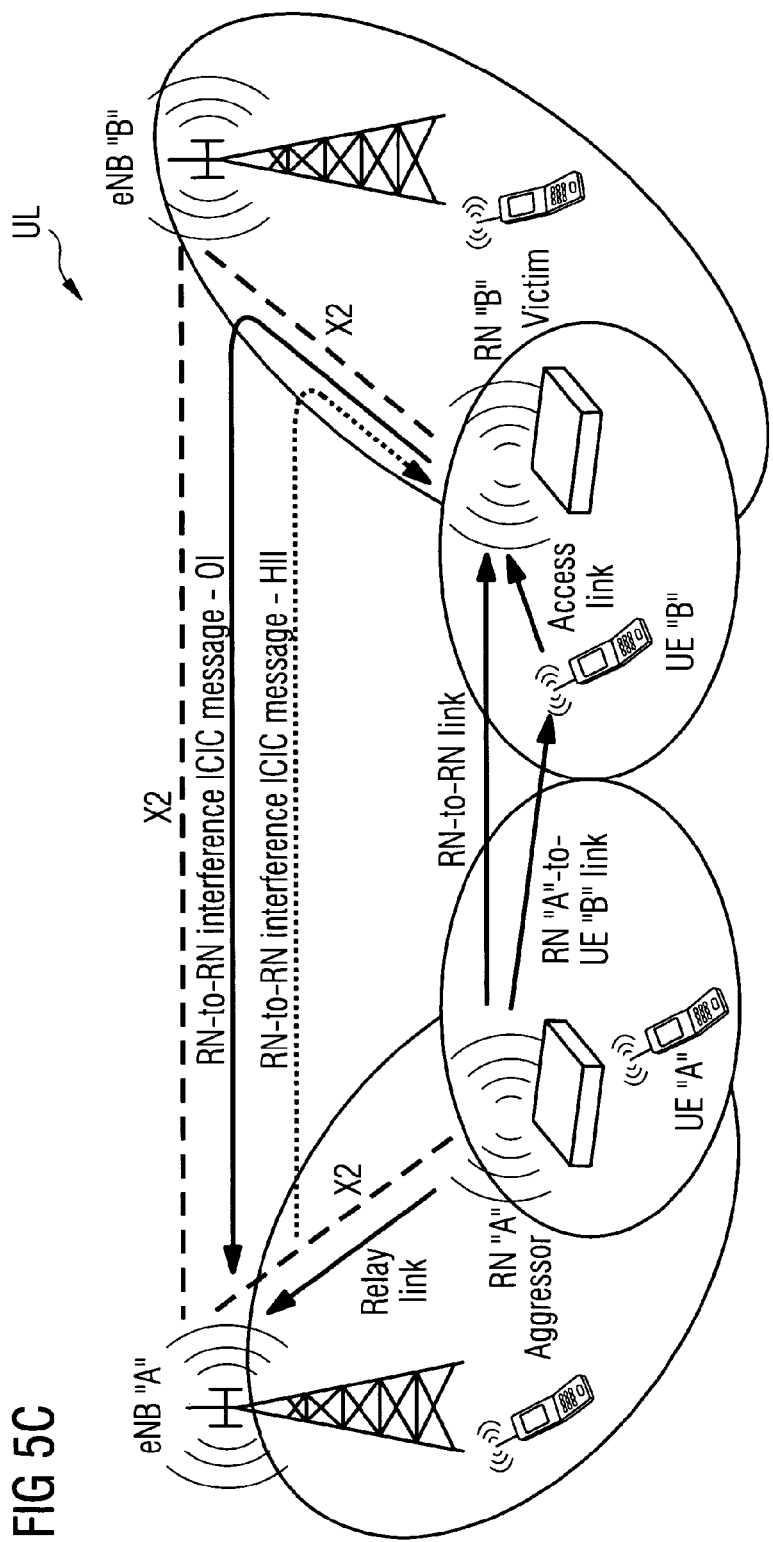
Figure 5D:
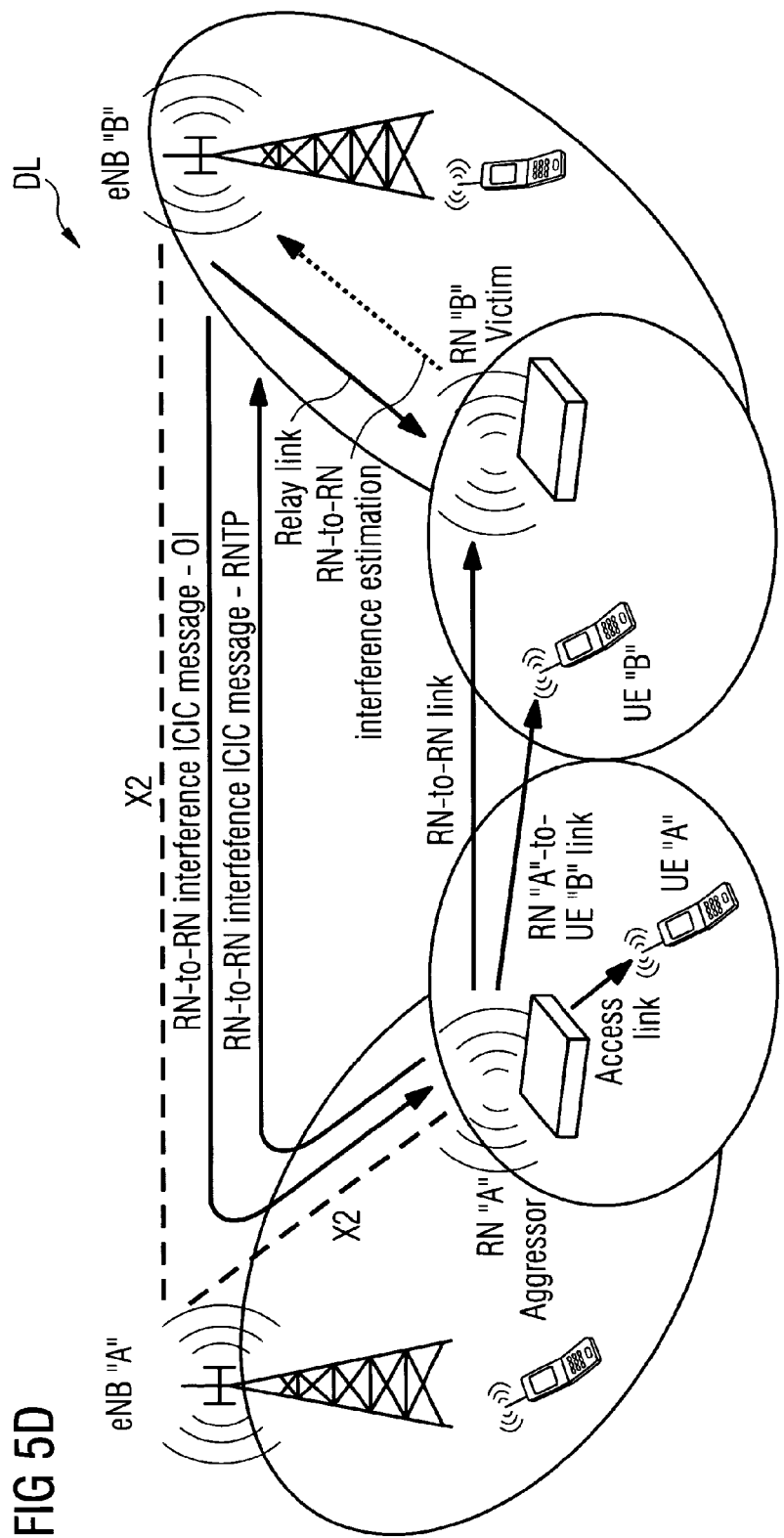

FIGS. 5C and 5D show the UL and the DL cases, respectively, and present an exemplary (and non-limiting) scenario where flagged legacy ICIC messages are exchanged. The specific messages shown are not limiting as newly defined interference reports and messages could be used as well. In both FIGS. 5C and 5D it is assumed that RN "A" is the aggressor and RN "B" is the victim for both the UL and the DL.

For the UL case of FIG. 5C the victim RN "B" sends the interference report and the OI (which describes on which PRBs it experiences high interference) to the DeNB 12 (eNB "A") that controls the aggressor RN "A". The DeNB 12 (eNB "A") controlling the aggressor RN "A" can reply to the victim RN "B" by sending a HII message. This HII message describes on which PRBs it intends to schedule the uplink backhauling for the aggressor RN "A".

For DL case of FIG. 5D the DeNB 12 controlling the victim RN "B" (eNB "B") sends the interference report (according to the RN-to-RN interference estimation received from the victim RN "B") and the OI message (that describes on which PRBs the victim RN "B" experiences high interference) to the aggressor RN "A" via the eNB "A". The aggressor RN "A" can reply to the DeNB 12 controlling the victim RN "B" (eNB "B") with an RNTP message that describes on which PRBs the aggressor RN "A" intends to schedule the access link.

Referring again to FIG. 5B, note that this Figure can be viewed as an example for the UL (exchange of OI message) where an RN can be both the victim and the aggressor during a resource partitioning window.

The overall reliability of the estimation can be increased by utilizing measurements performed by other UEs 10 connected to the RN 16. In such an approach the access link measurements can be taken into account, e.g., for assigning reliability weights to each UE 10 as was noted above in the description of the interference estimation algorithm. In this case a particular UE 10 with higher access link quality may be assumed to be closer to the RN 16, and thus its measurements can be assigned a larger weight as compared to another UE 10 whose access link quality is lower (which may indicate a cell-edge UE).

The correlation of the UE 10 measurements with interference from the aggressor RN 16' may be exemplified by distance, although other factors can be used as a correlation metric as well. In general the correlation metric may be considered to include spatial distance and/or path loss as non-limiting examples.

Moreover, if the locations of different UEs are available this information can be used to further increase the reliability of the estimation. For example, if there are two UEs 10 located on different sides of the RN 16 and they both have LOS connections to the interfering (aggressor) RN 16', the RN 16 serving those two UEs can be assumed with a high probability to also have a LOS connection to the interfering RN. A similar conclusion can be drawn for the case of two UEs 10 with NLOS connections to the interfering RN, i.e., that the RN 16 serving those two UEs can be assumed with a high probability to also have a NLOS connection to the interfering RN.

In order to ensure reliability the initial estimations (the RN-to-RN interference ICIC messages) can be exchanged between the RNs 16 (instead of only between the victim RN 16 and the DeNB 12 serving the aggressor RN 16') to obtain better final estimations. In other words, RN "A" can estimate the RN-to-RN link channel depending on the measurements of UE "A" and on the other side RN "B" can estimate this channel depending on the measurements of UE "B". By means of using these two estimations regarding the same link the reliability of the estimations can be increased substantially.

Two example use cases can be given as:

1. The estimation exchange can be performed for all cases to obtain the highest reliability; and 2. The estimation exchange is performed only for certain scenarios, e.g., when a particular RN 16 has only cell edge UEs (relatively less reliable estimation) it can request an estimation exchange with another RN 16. Note that based on the initial estimation this RN 16 can still determine the main interfering RNs. This knowledge can decrease the overhead due to the estimation exchange as an exchange is only necessary with relevant RNs, not all the RNs in the vicinity.

The exemplary embodiments of this invention can be applied for those scenarios where an "RN-to-RN interference aware system" is desired. In one embodiment, even in a scenario where a particular RN does not serve any UEs, the measurements done by the macro-UEs (i.e., the UEs 10 served by the macro-cell of the donor eNB 12) who are close to (or actually within) the coverage area of the RN 16 can be used to estimate a possible high RN-to-RN interference. The DeNB 12 of the "possible" victim RN 16 can send the RN-to-RN interference message to the DeNB 12 of the aggressor RN 16', that can then take preventive actions to limit the high RN-to-RN interference before the possible victim RN 16 begins serving UEs 10. Possible actions can be, for example, to properly modify the resource partitioning in order to avoid the interference and/or to inform a RN 16 currently with no UEs 10 about the interference such that it can use this information to properly schedule new UEs. In addition, these measurements can be used when making handover decisions. For example, a macro-UE 10 is not handed over to a RN 16 if the estimated RN-to-RN interference is above a certain threshold, or it may wait until the RN-to-RN interference is alleviated. Such a UE 10 may also handover to another RN 16 where the received signal power from that RN is lower; however, the expected SINR levels might be higher due to the lower RN-to-RN interference level.

The exemplary embodiments can also be used to determine the main interfering RNs 16 in the relay system. If a signal exchange over the X2 interface 15 is not justified (the aggressor RN 16' is not in the neighboring cell), the victim RN 16 can take necessary actions itself. For instance, in the UL case the victim RN 16 may not schedule cell edge UEs 10 on the PRBs where the RN-to-RN interference is found to be too high.

The RN-to-RN interference estimation by means of UE 10 measurements and reports to the DeNB 12 can be enriched with information about the interference status per PRBs and TTIs. For this purpose certain of the legacy ICIC messages (OI, HII) extended to the time domain can be used. The RN "B" (victim RN 16) based on the SINR measurements on the access links of connected UEs can estimate the RN-to-RN interference and send also an Overload Indicator (OI) message to the DeNB "A". The RN "B" knows who the aggressor is and therefore if the SINR is very low on some PRBs and TTIs it can derive that it is due to RN-to-RN interference. To implement this procedure it would be desirable to modify the X2 signaling so that the eNB "A" receiving the ICIC message from RN "B" understands that the message received is for RN-to-RN interference coordination and not for the conventional Rel-8/9 ICIC between RN "B" and eNB "A" (i.e., it needs to know whether it is referred to the link to RN "A" or to the links to UE 10 connected to eNB "A"). A flag in the X2 message can be used (e.g., a single bit) to indicate that the ICIC message is not a conventional Rel-8/9 ICIC message. The DeNB 12 of the aggressor RN 16' can also send to the victim RN 16 a HII message (also with the above flag) to inform about the scheduling of the UL backhauling of RN "A".

It can be noted that the exemplary embodiments have been described thus far as reusing the existing ICIC messages to exchange interference information. However, as an alternative one or more new messages can be defined to exchange this information, possibly in a more efficient way. This may be desirable for messages conveyed on the Un link (the interface between the DeNB 12 and the RN 16) because the capacity of the Un link is expected to be a bottleneck of the relay system (while the conventional X2 link 15 capacity would typically be greater). In a further variant, any "new" messages can be translated into the "old" or legacy format by the DeNB 12 before being forwarded on the X2 link 15 to a neighboring DeNB 12 and/or the "old" format can be translated into a "new" format before forwarding on the Un link to the RN 16.

As was noted above, the exemplary embodiments of this invention are also applicable to the DL. In the DL the role of aggressor RN 16' and victim RN 16 can be the same. For instance, for the part of the resource partitioning window under consideration there is RN-to-RN interference from the aggressor RN 16' (RN A) that is transmitting on the access link (to its UE 10) in the DL that interferes with the victim RN 16 (RN B) who is receiving backhauling in the DL (from its DeNB 12). Note that for a given resource partitioning window (e.g., FIG. 4 the upper portion) an RN "A" and RN "B" can be both a victim and an aggressor. In the downlink, as also described above for the uplink, the RN-to-RN interference is symmetric, the victim RN 16 can be RN "A" and the aggressor RN 16' can be RN "B" when the victim RN "A" is receiving backhauling in the downlink from its DeNB 12 while the aggressor RN "B" is transmitting on the access link to its UE 10.

Therefore the RN-to-RN interference estimation discussed above is also useful for the coordination of RN-to-RN interference in the DL (as described above for FIG. 5D), the difference being that the DeNB 12 that controls the victim RN (RN "B") sends the OI interference report (received from the RN "B") to the RN "A" (aggressor RN 16') and eventually an OI message that describes on which PRBs the RN "B" experiences high interference on the DL backhauling, and the aggressor RN "A" sends a RNTP message to the DeNB "B" containing information on the power distribution over the scheduled PRBs for the RN "A" access link.

As can be appreciated, in the UL the victim RN 16 sends the interference report and the OI (describing on which PRBs it experiences high interference) to the DeNB controlling the aggressor RN 16'. The DeNB 12 controlling the aggressor RN 16' can reply to the victim RN 16 with an HII message (describing on which PRBs it intends to schedule the uplink backhauling for the aggressor RN 16'). In the DL the DeNB 12 controlling the victim RN 16 can send the interference report (received from the victim RN 16) and the OI (describing on which PRBs the victim RN 16 experiences high interference) to the aggressor RN 16'. The aggressor RN 16' can reply to the DeNB 12 controlling the victim RN 16 with an RNTP message (describing on which PRBs the aggressor RN 16' intends to schedule the access link).

The use of relaying is expected to be an important component of LTE-A. As such, some signaling is required, typically on the X2 interface 15 which connects neighboring eNBs, DeNBs and RNs (in the latter case via the Un interface), to exchange the interference report which is generated based on (possibly legacy) ICIC messages. The exemplary embodiments of this invention provide methods, apparatus and computer program(s) to facilitate the use of relaying and the reporting of RN-related interference.

Figure 7:
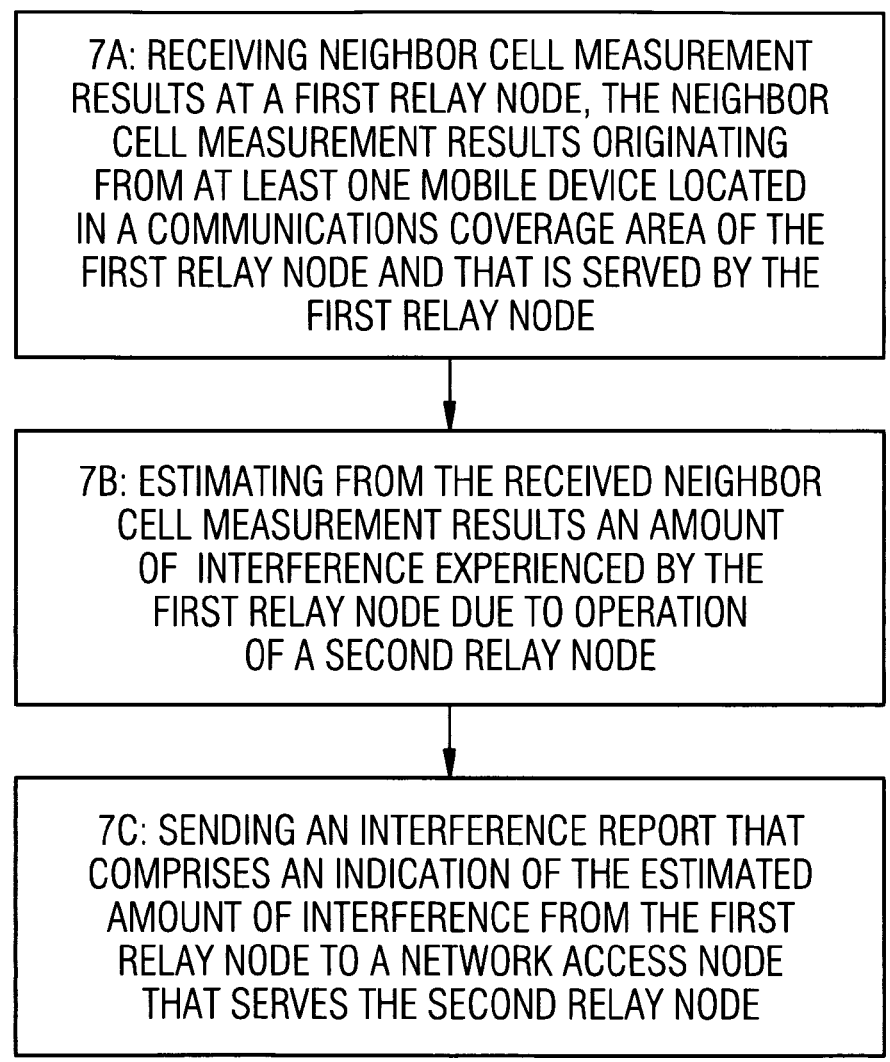
FIG. 7 is a logic flow diagram that illustrates the operation of a method, and a result of execution of computer program instructions embodied on a computer readable memory, in accordance with the exemplary embodiments of this invention for an uplink case.

FIG. 7 is a logic flow diagram that illustrates the operation of a method, and a result of execution of computer program instructions, in accordance with the exemplary embodiments of this invention. In accordance with these exemplary embodiments a method performs, at Block 7A, a step of receiving neighbor cell measurement results at a first relay node, the neighbor cell measurement results originating from at least one mobile device located in a communications coverage area of the first relay node and that is served by the first relay node. At Block 7B there is a step of estimating from the received neighbor cell measurement results an amount of interference experienced by the first relay node due to operation of a second relay node. At Block 7C there is a step of sending an interference report that comprises an indication of the estimated amount of interference from the first relay node to a network access node that serves the second relay node.

In the method as depicted in FIG. 7, and described in the preceding paragraph, where the network access node that serves the second relay node is different from a network access node that serves the first relay node, and where the interference report is sent from the first relay node over a wireless link between the first relay node and the network access node that serves the first relay node, and from the network access node that serves the first relay node to the network access node that serves the second relay node.

In the method as depicted in FIG. 7, and described in the preceding paragraphs, where the neighbor cell measurement results comprise reference signal received power and reference signal received quality measurement results, and where the interference report comprises an intercell interference coordination type of message.

In the method as depicted in FIG. 7, and described in the preceding paragraphs, where an overload indicator is sent from the first relay node when it is a victim relay node to the network access node that serves the second relay node, and where a high interference indicator is received at the first relay node from the network access node serving the second relay node when it is an aggressor relay node.

In the method as depicted in FIG. 7, and described in the preceding paragraph, where the overload indicator sent by the first relay node indicates on which physical resource block or resource blocks the first relay node experiences interference from the second relay node, and where the high interference indicator received from the network access node that serves the second relay node indicates on which physical resource block or resource blocks the second network access node will schedule uplink backhauling for the second relay node.

In the method as depicted in FIG. 7, and described in the preceding paragraphs, where the measurement results are received from a plurality of mobile devices and are weighted in accordance with a metric related to at least one of distance and path loss of each mobile device.

In the method as depicted in FIG. 7, and described in the preceding paragraphs, and further comprising exchanging preliminary interference estimation results with the second relay node to derive a final interference estimation, and where the interference report comprises an indication of the final interference estimation.

In the method as depicted in FIG. 7, and described in the preceding paragraphs, and further comprising making an interference estimation at a network access node at least partially on a neighbor cell measurement report made by at least a mobile device that is served by the network access node and that is located close to or within the coverage area of the first relay node, and where the network access node sends an interference report that comprises an indication of the estimated amount of interference to the network access node that serves the second relay node and to the first relay node.

The exemplary embodiments also encompass a non-transitory computer-readable medium that contains software program instructions, where execution of the software program instructions by at least one data processor results in performance of operations that comprise execution of the method shown in FIG. 7 and the foregoing several paragraphs descriptive of FIG. 7.

Figure 8:
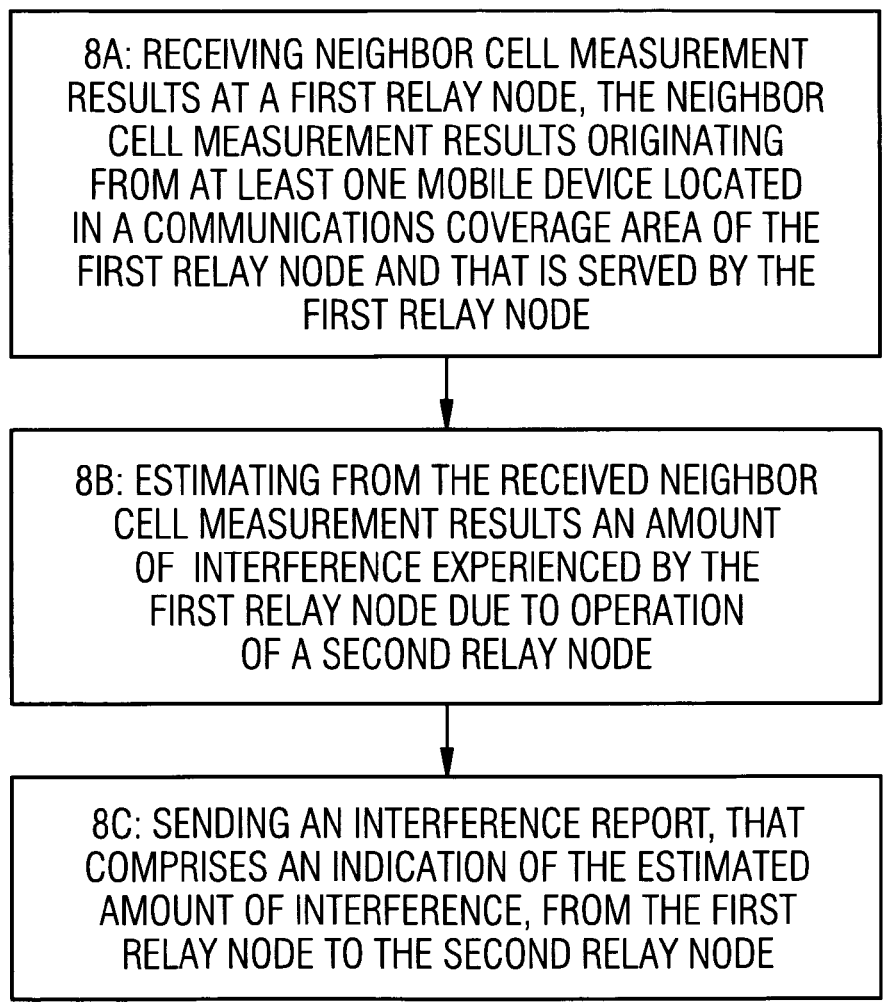
FIG. 8 is a logic flow diagram that illustrates the operation of a method, and a result of execution of computer program instructions embodied on a computer readable memory, in accordance with the exemplary embodiments of this invention for a downlink case.

FIG. 8 is a logic flow diagram that illustrates the operation of a method, and a result of execution of computer program instructions, in accordance with the exemplary embodiments of this invention. In accordance with these exemplary embodiments a method performs, at Block 8A, a step of receiving neighbor cell measurement results at a first relay node, the neighbor cell measurement results originating from at least one mobile device located in a communications coverage area of the first relay node and that is served by the first relay node. At Block 8B there is a step of estimating from the received neighbor cell measurement results an amount of interference experienced by the first relay node due to operation of a second relay node. At Block 8C there is a step of sending an interference report that comprises an indication of the estimated amount of interference from the first relay node to the second relay node.

In the method as depicted in FIG. 8, and described in the preceding paragraph, where the interference report is sent via a network access node that serves the second relay node, where the network access node that serves the second relay node is different from a network access node that serves the first relay node, and where the interference report is sent from the first relay node over a wireless link between the first relay node and the network access node that serves the first relay node, and from the network access node that serves the first relay node to the network access node that serves the second relay node, and from the network access node that serves the second relay node over a wireless link to the second relay node.

In the method as depicted in FIG. 8, and described in the preceding paragraphs, where the neighbor cell measurement results comprise reference signal received power and reference signal received quality measurement results, and where the interference report comprises an intercell interference coordination type of message.

In the method as depicted in FIG. 8, and described in the preceding paragraphs, where an overload indicator sent by the first relay node indicates on which physical resource block or resource blocks the first relay node experiences interference from the second relay node.

In the method as depicted in FIG. 8, and described in the preceding paragraphs, where the first relay node when it is an aggressor relay node replies to the receipt of the indication of the estimated amount of interference from a victim relay node by sending to the network access node that serves the victim relay node an indication of which physical resource block or physical resource blocks the first relay node will use to schedule an access link.

In the method as depicted in FIG. 8, and described in the preceding paragraphs, where the measurement results are received from a plurality of mobile devices and are weighted in accordance with a metric related to at least one of distance and path loss of each mobile device.

In the method as depicted in FIG. 8, and described in the preceding paragraphs, further comprising exchanging preliminary interference estimation results with the second relay node to derive a final interference estimation, and where the interference report comprises an indication of the final interference estimation.

In the method as depicted in FIG. 8, and described in the preceding paragraphs, further comprising making an interference estimation at a network access node at least partially on a neighbor cell measurement report made by at least a mobile device that is served by the network access node and that is located close to or within the coverage area of the first relay node, and where the network access node sends an interference report that comprises an indication of the estimated amount of interference to the network access node that serves the second relay node and to the first relay node.

The exemplary embodiments also encompass a non-transitory computer-readable medium that contains software program instructions, where execution of the software program instructions by at least one data processor results in performance of operations that comprise execution of the method shown in FIG. 8 and the foregoing several paragraphs descriptive of FIG. 8.

FIG. 9 is a logic flow diagram that illustrates the operation of a method, and a result of execution of computer program instructions, further in accordance with the exemplary embodiments of this invention. In accordance with these exemplary embodiments a method performs, at Block 9A, a step of receiving at a first network access node an interference report from a first relay node that is served by the first network access node. At Block 9B there is a step of sending the received interference report to a second network access node that serves a second relay node, where the interference report comprises an estimate of an amount of interference experienced by the first relay node due to operation of the second relay node.

In the method as depicted in FIG. 9, and described in the preceding paragraph, the interference report is received in a first format, and further comprising changing the format of the interference report to a second format prior to sending the interference report to the second network access node.

In the method as depicted in FIG. 9, and described in the preceding paragraphs, and further comprising receiving at the first network access node an interference report from another network access node; determining if the received interference report is a first type of interference report or a second type of interference report; and only if the received inference report is of the first type taking a corrective action with respect to the first relay node to reduce inference caused by the first relay node to another relay node served by the another network access node.

In the method as depicted in FIG. 9, and described in the preceding paragraphs, where the interference report comprises interference status for at least one physical resource block and at least one transmission time interval.

In the method as depicted in FIG. 9, and described in the preceding paragraphs, where the received interference report is comprised of an overload indicator that indicates on which physical resource block or resource blocks the first relay node experiences interference from the second relay node, further comprising receiving a high interference indicator from the network access node that serves the second relay node and that indicates on which physical resource block or resource blocks the second network access node will schedule uplink backhauling for the second relay node, and further comprising sending the received high interference indicator to the first relay node.

In the method as depicted in FIG. 9, and described in the preceding paragraphs, where the received interference report is comprised of an overload indicator that indicates on which physical resource block or resource blocks the first relay node experiences interference from the second relay node, further comprising receiving from the second relay node an indication of which physical resource block or physical resource blocks the second relay node will use to schedule an access link.

In the method as depicted in FIG. 9, and described in the preceding paragraphs, further comprising making an interference estimation at the network access node at least partially on a neighbor cell measurement report made by at least a mobile device that is served by the network access node and that is located close to or within the coverage area of the first relay node, and where the network access node sends an interference report that comprises an indication of the estimated amount of interference to the network access node that serves the second relay node and to the first relay node.

The exemplary embodiments of this invention also encompass a non-transitory computer-readable medium that contains software program instructions, where execution of the software program instructions by at least one data processor results in performance of operations that comprise execution of the method shown in FIG. 9 and the foregoing several paragraphs descriptive of FIG. 9.

The various blocks shown in FIGS. 7, 8 and 9 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Another aspect of the exemplary embodiments of this invention is an apparatus that comprises at least one processor and at least one memory including computer program code. The memory and computer program code are configured to, with the at least one processor, cause the apparatus to receive neighbor cell measurement results at a first relay node, the neighbor cell measurement results originating from at least one mobile device located in a communications coverage area of the first relay node and that is served by the first relay node;

to estimate from the received neighbor cell measurement results an amount of interference experienced by the first relay node due to operation of a second relay node; and to send an interference report that comprises an indication of the estimated amount of interference from the first relay node to a network access node that serves the second relay node.

A further aspect of the exemplary embodiments of this invention is an apparatus that comprises means for receiving neighbor cell measurement results (e.g., a receiver of transceiver 16D) at a first relay node, the neighbor cell measurement results originating from at least one mobile device located in a communications coverage area of the first relay node and that is served by the first relay node; means for estimating (e.g., data processor 16A in combination with memory 16B and program 16C) from the received neighbor cell measurement results an amount of interference experienced by the first relay node due to operation of a second relay node; and means for sending an interference report (e.g., a transmitter of transceiver 16D) that comprises an indication of the estimated amount of interference, from the first relay node to one of a network access node that serves the second relay node or to the second relay node via the network access node that serves the second relay node.

A further aspect of the exemplary embodiments of this invention is an apparatus that comprises means for receiving at a first network access node (e.g., a receiver of transceiver 12D) an interference report from a first relay node that is served by the first network access node; and means for sending the received interference report (e.g., the interface circuitry 12F connected with X2 interface 15) to a second network access node that serves a second relay node, where the interference report comprises an estimate of an amount of interference experienced by the first relay node due to operation of the second relay node.

Based on the foregoing it should be appreciated that a still further aspect of the exemplary embodiments of this invention is to provide and apparatus and a method whereby neighbor cell measurement results are received at a first relay node, the neighbor cell measurement results originating from at least one mobile device located in a communications coverage area of the first relay node and that is served by the first relay node, and where an estimate is made from the received neighbor cell measurement results of an amount of interference experienced by the first relay node due to operation of a second relay node.

It should be further appreciated that at least some aspects of the exemplary embodiments of the invention may be practiced in, and certain of the means can comprise, various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications or combination of the exemplary embodiments will still fall within the scope of the non-limiting and exemplary embodiments of this invention.

For example, while the exemplary embodiments have been described above in the context of the UTRAN LTE-A system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., RSRQ, RSRP, ICIC, OI, HII, RNTP, etc.) are not intended to be limiting in any respect, as these parameters may be identified by any suitable names. Further, the various names assigned to different channels, interfaces and links (e.g., X2, Un, access link, RN-to-RN link, backhaul link, etc.) are not intended to be limiting in any respect, as these various channels, interfaces and links may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   receiving neighbor cell measurement results at a first relay node, the neighbor cell measurement results originating from at least one mobile device located in a communications coverage area of the first relay node and served by the first relay node;
   estimating from the received neighbor cell measurement results an amount of interference experienced by the first relay node due to operation of a second relay node; and
   sending an interference report, comprising an indication of the estimated amount of interference, from the first relay node to a network access node serving the second relay node or to the second relay node.

2. The method of claim 1, wherein the network access node serving the second relay node is different from a network access node serving the first relay node, and wherein the interference report is sent from the first relay node over a wireless link between the first relay node and the network access node serving the first relay node, and from the network access node serving the first relay node to the network access node serving the second relay node.

3. The method of claim 1, wherein sending an interference report comprises sending the interference report from the first relay node to a network access node serving the second relay node, and wherein an overload indicator is sent from the first relay node, when the first relay node is a victim relay node, to the network access node serving the second relay node, and wherein a high interference indicator is received at the first relay node from the network access node serving the second relay node when the second relay node is an aggressor relay node.

4. The method of claim 3, wherein the overload indicator sent by the first relay node indicates a physical resource block or resource blocks where the first relay node experiences interference from the second relay node, and wherein the high interference indicator received from the network access node serving the second relay node indicates a physical resource block or resource blocks where the second network access node will schedule uplink backhauling for the second relay node.

5. The method of claim 1, further comprising exchanging preliminary interference estimation results with the second relay node to derive a final interference estimation, and wherein the interference report comprises an indication of the final interference estimation.

6. The method of claim 2, wherein the interference report is sent via the network access node serving the second relay node, and from the network access node serving the second relay node over a wireless link to the second relay node.

7. The method of claim 1, wherein sending an interference report comprises sending an interference report to the second relay node, and wherein an overload indicator sent by the first relay node indicates a physical resource block or resource blocks where the first relay node experiences interference from the second relay node.

8. The method of claim 1, wherein sending an interference report comprises sending an interference report to the second relay node, and wherein the first relay node, when the first relay node is an aggressor relay node, replies to the receipt of the indication of an estimated amount of interference from a victim relay node by sending to the network access node serving the victim relay node an indication of a physical resource block or physical resource blocks the first relay node will use to schedule an access link.

9. An apparatus comprising:
at least one processor; and
at least one memory including computer program code, wherein the at least one memory and the computer program code are configured, with the at least one processor, to cause the apparatus to:
receive neighbor cell measurement results at a first relay node, the neighbor cell measurement results originating from at least one mobile device located in a communications coverage area of the first relay node and served by the first relay node;
estimate from the received neighbor cell measurement results an amount of interference experienced by the first relay node due to operation of a second relay node; and
send an interference report comprising an indication of the estimated amount of interference from the first relay node to a network access node serving the second relay node or to the second relay node.

10. The apparatus of claim 9, wherein the network access node serving the second relay node is different from a network access node serving the first relay node, and wherein the interference report is sent from the first relay node over a wireless link between the first relay node and the network access node serving the first relay node, and from the network access node serving the first relay node to the network access node serving the second relay node.

11. The apparatus of claim 9, wherein the neighbor cell measurement results comprise reference signal received power and reference signal received quality measurement results, and wherein the interference report comprises an intercell interference coordination type of message.

12. The apparatus of claim 9, wherein send an interference report further comprises to send the interference report from the first relay node to a network access node serving the second relay node, and wherein an overload indicator is sent from the first relay node, when the first relay node is a victim relay node, to the network access node serving the second relay node, and wherein a high interference indicator is received at the first relay node from the network access node serving the second relay node when the second relay node is an aggressor relay node.

13. The apparatus of claim 12, wherein the overload indicator sent by the first relay node indicates a physical resource block or resource blocks where the first relay node experiences interference from the second relay node, and wherein the high interference indicator received from the network access node serving the second relay node indicates a physical resource block or resource blocks where the second network access node will schedule uplink backhauling for the second relay node.

14. The apparatus of claim 9, wherein the at least one memory and the computer program code are further configured, with the at least one processor, to exchange preliminary interference estimation results with the second relay node to derive a final interference estimation, and wherein the interference report comprises an indication of the final interference estimation.

15. The apparatus of claim 10, wherein the interference report is sent via the network access node serving the second relay node, and from the network access node serving the second relay node over a wireless link to the second relay node.

16. The apparatus of claim 9, wherein send an interference report comprises send an interference report to the second relay node, and wherein an overload indicator sent by the first relay node indicates a physical resource block or resource blocks where the first relay node experiences interference from the second relay node.

17. The apparatus of claim 9, wherein send an interference report comprises send an interference report to the second relay node, and wherein the first relay node, when the first relay node is an aggressor relay node, replies to the receipt of the indication of the estimated amount of interference from a victim relay node by sending to the network access node serving the victim relay node an indication of a physical resource block or physical resource blocks the first relay node will use to schedule an access link.

18. A method comprising:
receiving at a first network access node an interference report from a first relay node served by the first network access node; and
sending the received interference report to a second network access node serving a second relay node, wherein the interference report comprises an estimate of an amount of interference experienced by the first relay node due to operation of the second relay node.

19. The method of claim 18, further comprising:
receiving at the first network access node an interference report from another network access node;
determining whether the received interference report is a first type of interference report or a second type of interference report; and
when the received inference report is of the first type, taking a corrective action with respect to the first relay node to reduce interference caused by the first relay node to another relay node served by the another network access node.

20. The method of claim 18, wherein the received interference report comprises an overload indicator indicating a physical resource block or resource blocks where the first relay node experiences interference from the second relay node, and further comprising receiving a high interference indicator from the network access node serving the second relay node and indicating a physical resource block or resource blocks where the second network access node will schedule uplink backhauling for the second relay node, and sending the received high interference indicator to the first relay node.

21. The method of claim 18, wherein the received interference report comprises an overload indicator indicating a physical resource block or resource blocks where the first relay node experiences interference from the second relay node, and further comprising receiving from the second relay node an indication of a physical resource block or physical resource blocks the second relay node will use to schedule an access link.

22. An apparatus comprising:
    at least one processor; and
    at least one memory including computer program code, wherein the at least one memory and the computer program code are configured, with the at least one processor, to cause the apparatus to:
    receive at a first network access node an interference report from a first relay node served by the first network access node; and
    send the received interference report to a second network access node serving a second relay node, wherein the interference report comprises an estimate of an amount of interference experienced by the first relay node due to operation of the second relay node.

23. The apparatus of claim 22, wherein the at least one memory and the computer program code are further configured, with the at least one processor, to:
    receive at the first network access node an interference report from another network access node;
    determine whether the received interference report is a first type of interference report or a second type of interference report; and
    when the received interference report is of the first type, take a corrective action with respect to the first relay node to reduce interference caused by the first relay node to another relay node served by the another network access node.

24. The apparatus of claim 22, wherein the received interference report comprises an overload indicator indicating a physical resource block or resource blocks where the first relay node experiences interference from the second relay node, and wherein the at least one memory and the computer program code are further configured, with the at least one processor, to receive a high interference indicator from the network access node serving the second relay node and indicating a physical resource block or resource blocks where the second network access node will schedule uplink backhauling for the second relay node, and to send the received high interference indicator to the first relay node.

25. The apparatus of claim 22, wherein the received interference report comprises an overload indicator indicating a physical resource block or resource blocks where the first relay node experiences interference from the second relay node, and wherein the at least one memory and the computer program code are further configured, with the at least one processor, to receive from the second relay node an indication of a physical resource block or physical resource blocks the second relay node will use to schedule an access link.

\* \* \* \* \*